US010855202B2

(12) United States Patent
Chen et al.

(10) Patent No.: US 10,855,202 B2
(45) Date of Patent: Dec. 1, 2020

(54) INVERTER CIRCUIT, INVERTER, AND CONTROL METHOD AND APPARATUS OF AN INVERTER CIRCUIT

(71) Applicant: Vertiv Corporation, Columbus, OH (US)

(72) Inventors: Peng Chen, Guangdong (CN); Yang Bing, Guangdong (CN)

(73) Assignee: Vertiv Corporation, Columbus, OH (US)

( * ) Notice: Subject to any disclaimer, the term of this patent is extended or adjusted under 35 U.S.C. 154(b) by 0 days.

(21) Appl. No.: 16/531,670

(22) Filed: Aug. 5, 2019

(65) Prior Publication Data

US 2020/0313568 A1    Oct. 1, 2020

(30) Foreign Application Priority Data

Mar. 28, 2019 (CN) .......................... 2019 1 0244789

(51) Int. Cl.
*H02M 7/5387* (2007.01)
*H02M 7/53* (2006.01)

(52) U.S. Cl.
CPC ............ *H02M 7/5387* (2013.01); *H02M 7/53* (2013.01)

(58) Field of Classification Search
CPC .......... H02M 7/42; H02M 7/48; H02M 7/487; H02M 7/501; H02M 7/4826; H02M 7/497; H02M 7/49; H02M 7/4807; H02M 7/537; H02M 7/5387; H02M 7/53; H02M 7/533; H02M 2007/4803; H02M 2007/4822
See application file for complete search history.

(56) References Cited

U.S. PATENT DOCUMENTS

| 4,788,634 A | 11/1988 | Schlecht et al. |
| 2016/0028342 A1* | 1/2016 | Furukawa ............... H02P 27/06 318/503 |
| 2017/0133947 A1* | 5/2017 | Fu .......................... H02M 7/487 |
| 2017/0155313 A1* | 6/2017 | Mao ....................... H02M 1/081 |
| 2018/0219492 A1* | 8/2018 | Shi ......................... H02M 7/483 |

FOREIGN PATENT DOCUMENTS

CN        105450064 B    11/2018

OTHER PUBLICATIONS

Extended European Search Report regarding Application No. 19189422.9 dated Feb. 17, 2020.

* cited by examiner

*Primary Examiner* — Bryan R Perez
(74) *Attorney, Agent, or Firm* — Harness, Dickey & Pierce, P.L.C.

(57) ABSTRACT

Embodiments of the present invention disclose an inverter circuit, an inverter, and a control method and apparatus of an inverter circuit, which are used to solve the problem of direct connection of bridge arms of an inverter circuit. The inverter circuit comprises an inverter module and a filter module that are sequentially connected, wherein the inverter module comprises: a first bridge arm, comprising a first switch tube, a first inductor, a second inductor and a second switch tube that are sequentially connected in series; a second bridge arm, comprising a third switch tube and a first diode that are connected in series; a third bridge arm, comprising a fourth switch tube and a second diode that are connected in series; a first freewheeling branch; and a second freewheeling branch.

13 Claims, 12 Drawing Sheets

INVERTER CIRCUIT, INVERTER, AND CONTROL METHOD AND APPARATUS OF AN INVERTER CIRCUIT

CROSS REFERENCE TO RELATED APPLICATION

This application claims priority to Chinese Patent Application No. 201910244789.8 filed on Mar. 28, 2019 and entitled "AN INVERTER CIRCUIT, INVERTER, AND CONTROL METHOD AND APPARATUS OF AN INVERTER CIRCUIT", the disclosure of which is incorporated herein by reference in its entirety.

FIELD OF THE INVENTION

The present invention relates to the field of power electronics technology, and particularly to an inverter circuit, an inverter, and a control method and apparatus of an inverter circuit.

BACKGROUND

With the rapid development of power electronics technology, inverters have been widely applied in various fields such as uninterruptible power supplies, power generation from new energy resources, frequency converters, and electric automobiles, and are developing toward the direction of high reliability, high power density and high efficiency.

As shown in FIG. 1, in a traditional inverter circuit, an inverter bridge arm formed by a switch tube Q1 and a switch tube Q4 is connected between a positive bus and a negative bus, and an inverter bridge arm formed by a switch tube Q2 and a switch tube Q3 is connected at one end with a neural point and at the other end with a midpoint of the inverter bridge arm formed by the switch tube Q1 and the switch tube Q4. Such an inverter circuit will damage a power supply and other devices and reduce greatly reliability of the inverter circuit in cases where the switch tube Q1 and the switch tube Q4 are simultaneously switched on, the switch tube Q1 and the switch tube Q3 are simultaneously switched on and the switch tube Q2 and the switch tube Q4 are simultaneously switched on, i.e., in cases where the inverter bridge arms are in direct connection.

In view of this, in the prior art it is usual to solve the problem of direct connection of bridge arms of an inverter circuit by setting a dead time. However, on the one hand, the setting of the dead time will increase output voltage harmonics and influence output electric energy quality, and on the other hand, even if the dead time is set, the direct connection of the bridge arms of the inverter circuit still will be caused due to some interferences or switch tube device failures.

SUMMARY OF THE INVENTION

Embodiments of the present invention provide an inverter circuit, an inverter, and a control method and apparatus of an inverter circuit, which are used to solve the problem of direct connection of bridge arms of an inverter circuit, so as to improve the reliability of the inverter circuit.

In a first aspect, an embodiment of the present invention provides an inverter circuit, comprising an inverter module and a filter module that are sequentially connected, wherein the inverter module comprises:

a first bridge arm connected between a positive bus and a negative bus, comprising a first switch tube, a first inductor, a second inductor and a second switch tube that are sequentially connected in series;

a second bridge arm connected between a neural point and a first node, comprising a third switch tube and a first diode that are connected in series, a collector of the third switch tube being connected with the neural point, an emitter of the third switch tube being connected with an anode of the first diode, a cathode of the first diode being connected with the first node, the first node being a connection point between the first switch tube and the first inductor;

a third bridge arm connected between the neural point and a second node, comprising a fourth switch tube and a second diode that are connected in series, an emitter of the fourth switch tube being connected with the neural point, a collector of the fourth switch tube being connected with a cathode of the second diode, an anode of the second diode being connected with the second node, the second node being a connection point between the second switch tube and the second inductor;

a first freewheeling branch connected between the positive bus and the second node; and a second freewheeling branch connected between the negative bus and the first node.

In the inverter circuit provided by the embodiment of the present invention, by connecting the first inductor and the second inductor in series between the first switch tube and the second switch tube in the first bridge arm, connecting the first diode in series with the third switch tube in the second bridge arm and connecting the second diode in series with the fourth switch tube in the third bridge arm, direct connection of bridge arms is prevented in the inverter circuit by part or all of the first inductor, the second inductor, the first diode and the second diode when any two or more than two of the first switch tube, the second switch tube, the third switch tube and the fourth switch tube are simultaneously switched on or devices fail, thus making it possible to, in comparison with the inverter circuit in the prior art, solve the problem of direct connection of bridge arms of an inverter circuit, so as to improve the reliability of the inverter circuit.

In a possible implementation, in the circuit provided by the embodiment of the present invention, the first inductor is connected with the second inductor such that their heteronymous ends are connected each other.

In the inverter circuit provided by the embodiment of the present invention, by connecting the first inductor with the second inductor such that their heteronymous ends are connected each other, it is possible to reduce sizes of magnetic elements (the first inductor and the second inductor), thus increasing power density.

In a possible implementation, in the circuit provided by the embodiment of the present invention, a collector of the first switch tube is connected with the positive bus, an emitter of the first switch tube is the first node, a collector of the second switch tube is the second node, an emitter of the second switch tube is connected with the negative bus.

In a possible implementation, in the circuit provided by the embodiment of the present invention, the first switch tube, the second switch tube, the third switch tube and the fourth switch tube each include an anti-parallel diode and a junction capacitor.

In a possible implementation, in the circuit provided by the embodiment of the present invention, the first diode and the second diode each include a junction capacitor.

In a possible implementation, in the circuit provided by the embodiment of the present invention, the first freewheeling branch comprises a third diode, and the third diode includes a junction capacitor, an anode of the third diode being connected with the second node, a cathode of the third diode being connected with the positive bus.

In a possible implementation, in the circuit provided by the embodiment of the present invention, the second freewheeling branch comprises a fourth diode, and the fourth diode includes a junction capacitor, an anode of the fourth diode being connected with the negative bus, a cathode of the fourth diode being connected with the first node.

In a second aspect, an embodiment of the present invention provides an inverter, wherein the inverter comprises the inverter circuit provided by the first aspect of the embodiment of the present invention.

In a third aspect, an embodiment of the present invention provides a control method of an inverter circuit, for controlling the inverter circuit provided by the first aspect of the embodiment of the present invention, comprising:

detecting an output voltage value and an output current value of the inverter circuit; and controlling states of the first switch tube, the second switch tube, the third switch tube and the fourth switch tube according to the output voltage value and the output current value.

In the control method of an inverter circuit provided by the embodiment of the present invention, by detecting currents in the first inductor and the second inductor in the inverter circuit, which are used as wave-by-wave limited currents in a positive half cycle and a negative half cycle of the inverter respectively, states of the first switch tube, the second switch tube, the third switch tube and the fourth switch tube in the inverter circuit are controlled, thereby making it possible to detect a direct connection fault of the bridge arms in a case where the currents in the inductors are not greater than a normal wave-by-wave limited current value, thereby switching off the switch tubes to protect the inverter circuit.

In a possible implementation, in the method provided by the embodiment of the present invention, the controlling states of the first switch tube, the second switch tube, the third switch tube and the fourth switch tube according to the output voltage value and the output current value comprises:

when the output voltage value is greater than zero and the output current value is greater than zero, controlling the first switch tube utilizing a preset Pulse Width Modulation PWM signal, controlling the third switch tube to be on and controlling the second switch tube and the fourth switch tube to be off;

when the output voltage value is greater than zero and the output current value is less than zero, controlling the fourth switch tube utilizing a preset Pulse Width Modulation PWM signal, and controlling the first switch tube, the second switch tube and the third switch tube to be off;

when the output voltage value is less than zero and the output current value is less than zero, controlling the second switch tube utilizing a preset Pulse Width Modulation PWM signal, controlling the fourth switch tube to be on and controlling the first switch tube and the third switch tube to be off; and when the output voltage value is less than zero and the output current value is greater than zero, controlling the third switch tube utilizing a preset Pulse Width Modulation PWM signal, and controlling the first switch tube, the second switch tube and the fourth switch tube to be off.

In a possible implementation, in the method provided by the embodiment of the present invention, the controlling states of the first switch tube, the second switch tube, the third switch tube and the fourth switch tube according to the output voltage value and the output current value comprises:

when the output voltage value is greater than zero and the output current value is greater than zero, controlling the first switch tube utilizing a preset Pulse Width Modulation PWM signal, controlling the third switch tube to be on and controlling the second switch tube and the fourth switch tube to be off;

when the output voltage value is greater than zero and the output current value is less than zero, controlling the fourth switch tube utilizing a preset Pulse Width Modulation PWM signal, controlling the third switch tube to be on and controlling the first switch tube and the second switch tube to be off;

when the output voltage value is less than zero and the output current value is less than zero, controlling the second switch tube utilizing a preset Pulse Width Modulation PWM signal, controlling the fourth switch tube to be on and controlling the first switch tube and the third switch tube to be off; and when the output voltage value is less than zero and the output current value is greater than zero, controlling the third switch tube utilizing a preset Pulse Width Modulation PWM signal, controlling the fourth switch tube to be on and controlling the first switch tube and the second switch tube to be off.

In a fourth aspect, an embodiment of the present invention provides a control apparatus of an inverter circuit, for controlling the inverter circuit provided by the first aspect of the embodiment of the present invention, comprising:

a detection unit for detecting an output voltage value and an output current value of the inverter circuit; and a control unit for controlling states of the first switch tube, the second switch tube, the third switch tube and the fourth switch tube according to the output voltage value and the output current value.

In a possible implementation, in the apparatus provided by the embodiment of the present invention, the control unit is further used for:

when the output voltage value is greater than zero and the output current value is greater than zero, controlling the first switch tube utilizing a preset pulse width modulation PWM signal, controlling the third switch tube to be on and controlling the second switch tube and the fourth switch tube to be off;

when the output voltage value is greater than zero and the output current value is less than zero, controlling the fourth switch tube utilizing a preset pulse width modulation PWM signal, and controlling the first switch tube, the second switch tube and the third switch tube to be off;

when the output voltage value is less than zero and the output current value is less than zero, controlling the second switch tube utilizing a preset pulse width modulation PWM signal, controlling the fourth switch tube to be on and controlling the first switch tube and the third switch tube to be off; and when the output voltage value is less than zero and the output current value is greater than zero, controlling the third switch tube utilizing a preset pulse width modulation PWM signal, and controlling the first switch tube, the second switch tube and the fourth switch tube to be off.

In a fifth aspect, an embodiment of the present application provides a control device of an inverter circuit, comprising: at least one processor, at least one memory and computer program instructions stored therein, wherein the computer program instructions, when executed by the processor, implement the method provided by the third aspect of the embodiment of the present application.

In a sixth aspect, an embodiment of the present application provides a computer readable storage medium having stored thereon computer program instructions that, when executed by a processor, implement the method provided by the third aspect of the embodiment of the present application.

BRIEF DESCRIPTION OF THE DRAWINGS

The drawings described herein are used to provide further understanding to the present application, and form a part of the present application. The illustrative embodiments of the present application and description thereof are used to explain the present application, but do not form an improper limitation to the present application. In the appended drawings.

DETAILED DESCRIPTION

Hereinafter, specific implementations of an inverter circuit, an inverter, and a control method and apparatus of an inverter circuit provided by embodiments of the present invention will be described in detail in conjunction with the appended drawings.

Figure 1:
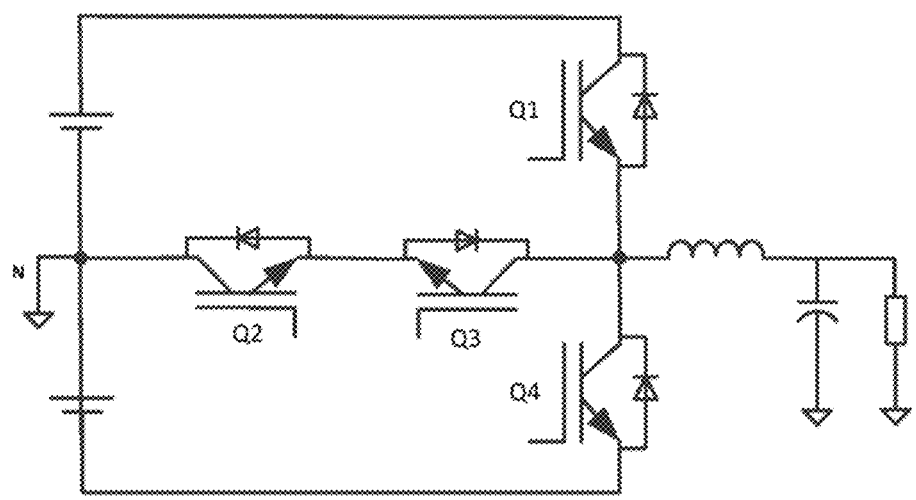
FIG. 1 is a structure schematic diagram of an inverter circuit provided in the prior art.
Figure 2:
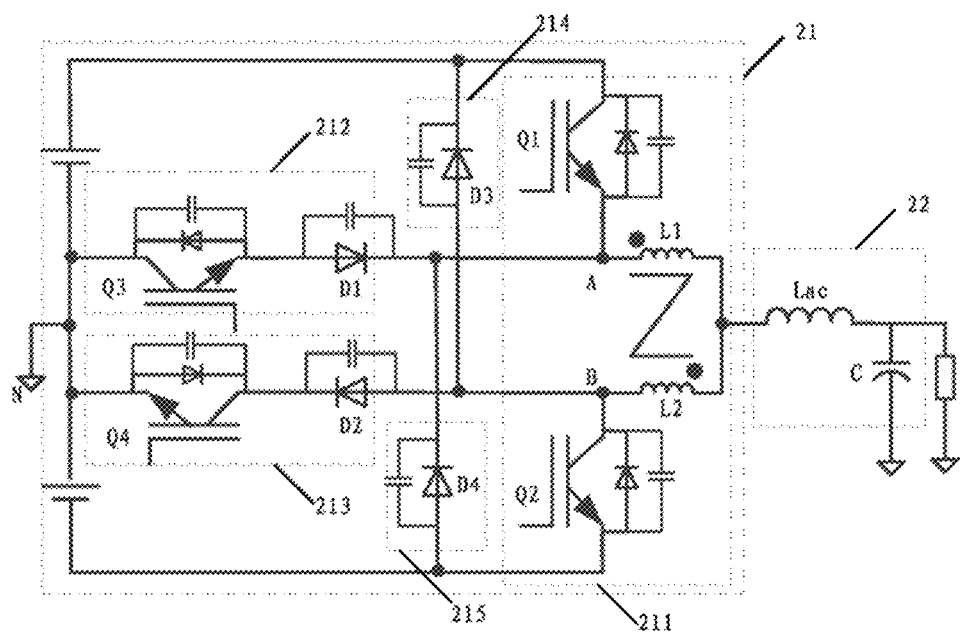
FIG. 2 is a structure schematic diagram of an inverter circuit provided by an embodiment of the present invention.

As shown in FIG. 2, an inverter circuit provided by an embodiment of the present invention comprises: an inverter module 21 and a filter module 22 that are sequentially connected.

Wherein, the inverter module 21 comprises: a first bridge arm 211, a second bridge arm 212, a third bridge arm 213, a first freewheeling branch 214, and a second freewheeling branch 215. Specifically:

The first bridge arm 211 is connected between a positive bus and a negative bus, and comprises a first switch tube Q1, a first inductor L1, a second inductor L2 and a second switch tube Q2 that are sequentially connected in series.

The second bridge arm 212 is connected between a neural point and a first node A, and comprises a third switch tube Q3 and a first diode D1 that are connected in series, a collector of the third switch tube Q3 being connected with the neural point, an emitter of the third switch tube Q3 being connected with an anode of the first diode D1, a cathode of the first diode D1 being connected with the first node A, the first node A being a connection point between the first switch tube and the first inductor.

The third bridge arm 213 is connected between the neural point and a second node B, comprising a fourth switch tube Q4 and a second diode D2 that are connected in series, an emitter of the fourth switch tube Q4 being connected with the neural point, a collector of the fourth switch tube Q4 being connected with a cathode of the second diode D2, an anode of the second diode D2 being connected with the second node B, the second node B being a connection point between the second switch tube Q2 and the second inductor L2.

The first freewheeling branch 214 is connected between the positive bus and the second node B. The second freewheeling branch 215 is connected between the negative bus and the first node A.

In specific implementation, a collector of the first switch tube Q1 is connected with the positive bus, an emitter of the first switch tube Q1 is connected with one end of the first inductor L1, a collector of the second switch tube Q2 is connected with one end of the second inductor L2, and an emitter of the second switch tube Q2 is connected with the negative bus. The first switch tube Q1, the second switch tube Q2, the third switch tube Q3 and the fourth switch tube Q4 each include an anti-parallel diode and a junction capacitor. The first diode D1 and the second diode D2 each include a junction capacitor.

In specific implementation, the first freewheeling branch comprises a third diode D3, and the third diode D3 includes a junction capacitor, an anode of the third diode D3 being connected with the second node B, a cathode of the third diode D3 being connected with the positive bus.

In specific implementation, the second freewheeling branch comprises a fourth diode D4, and the fourth diode D4 includes a junction capacitor, an anode of the fourth diode D4 being connected with the negative bus, a cathode of the fourth diode D4 being connected with the first node A.

In specific implementation, the filter module 22 comprises an inductor assembly Lac and a capacitor assembly C that are connected in series, a connection point between the inductor assembly Lac and the capacitor assembly C being an output of the inverter circuit.

It should be noted that, in the inverter circuit provided by the embodiment of the present invention, the first switch tube Q1, the second switch tube Q2, the third switch tube Q3 and the fourth switch tube Q4 may be either Metal-Oxide-Semiconductor Field-Effect Transistors (MOSFETs) or Insulated Gate Bipolar Transistors (IGBTs), and the embodiment of the present invention does not make a limitation hereto.

In a possible implementation, in the circuit provided by the embodiment of the present invention, the first inductor L1 is connected with the second inductor L2 such that their heteronymous ends are connected each other.

The circuit structure of the inverter circuit provided by the embodiment of the present invention has been described above in detail in conjunction with FIG. 2. Hereinafter, the operating principle of the inverter circuit provided by the embodiment of the present invention will be described in detail in conjunction with FIG. 3 to FIG. 22.

To be specific, within one output cycle of the inverter circuit, four phases are included, i.e., positive energy transfer phase (output voltage value is greater than zero, and output current value is greater than zero), positive energy feedback phase (output voltage value is greater than zero, and output current value is less than zero), negative energy transfer phase (output voltage value is less than zero, and output current value is less than zero) and negative energy feedback phase (output voltage value is less than zero, and output current value is greater than zero), with each phase comprising several operating modes, wherein outputs of the inverter bridge arms in the four phases are all unipolar modulated waves.

Phase 1: the output voltage value is greater than zero, and the output current value is greater than zero.

When the output voltage value is greater than zero and the output current value is greater than zero, the first switch tube Q1 is controlled utilizing a preset PWM signal, and the third switch tube Q3 is controlled to be on and the second switch tube Q2 and the fourth switch tube Q4 are controlled to be off.

It should be noted that, the preset PWM signal may either be determined by the method in the prior art or be configured in advance, and the embodiment of the present invention does not make a limitation hereto.

In specific implementation, when the output voltage value is greater than zero and the output current value is greater than zero, the inverter circuit has three operating modes, which are assumed to be marked as operating mode 1, operating mode 2 and operation mode 3 respectively. Hereinafter, the operating mode 1, the operating mode 2 and the operation mode 3 will be described in conjunction with FIG. 3 to FIG. 6 respectively.

Figure 3:
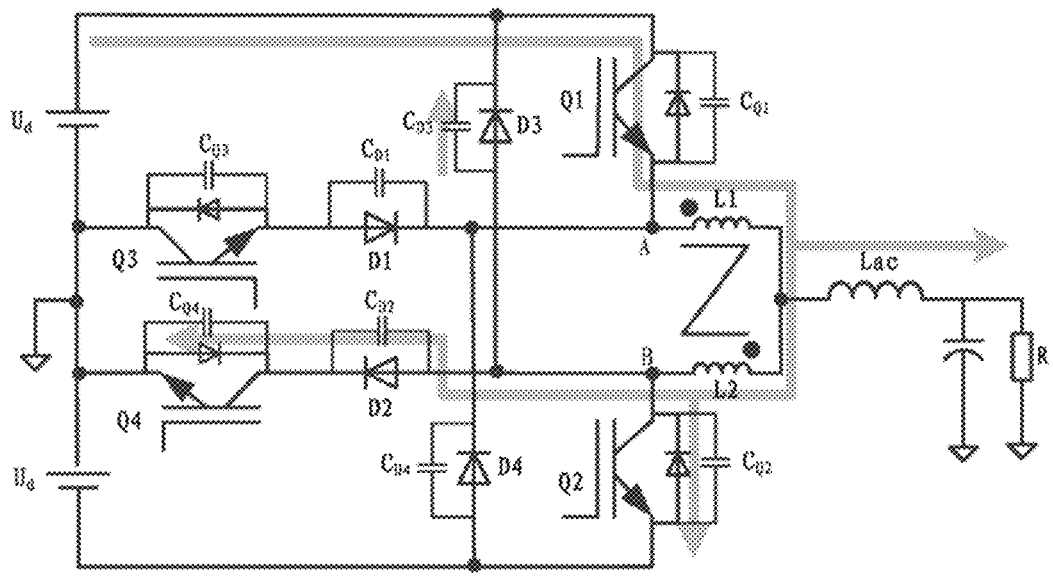
FIG. 3 is a principle schematic diagram of an operating mode 1 of an inverter circuit provided by an embodiment of the present invention.

As shown in FIG. 3, in the operating mode 1, the first switch tube Q1 and the third switch tube Q3 are switched on, while the second switch tube Q2, the fourth switch tube Q4, the first diode D1, the second diode D2, the third diode D3 and the fourth diode D4 are switched off. At this time, an input power supply $U_d$ supplies power to a load R through the first switch tube Q1, the first inductor L1 and the filter inductor Lac, a voltage of the first node A is $+U_d$, currents in the first inductor L1 and the filter inductor Lac rise, the input power supply $U_d$ charges the capacitor $C_{Q2}$ and the capacitor $C_{Q4}$ through the first inductor L1 and the second inductor L2, and the capacitor $C_{D2}$ and the capacitor $C_{D3}$ are discharged. Current $i_{L1}$ in the first inductor L1 and current $i_{L2}$ in the second inductor L2 resonate and rise, a voltage across the capacitor $C_{Q2}$ and a voltage across the capacitor $C_{Q4}$ rise, and a voltage across the capacitor $C_{D2}$ and a voltage across the capacitor $C_{D3}$ drop, until the voltage of the capacitor $C_{Q2}$ rises to $2U_d$ and the voltage of the capacitor $C_{D3}$ drops to zero.

Figure 4:
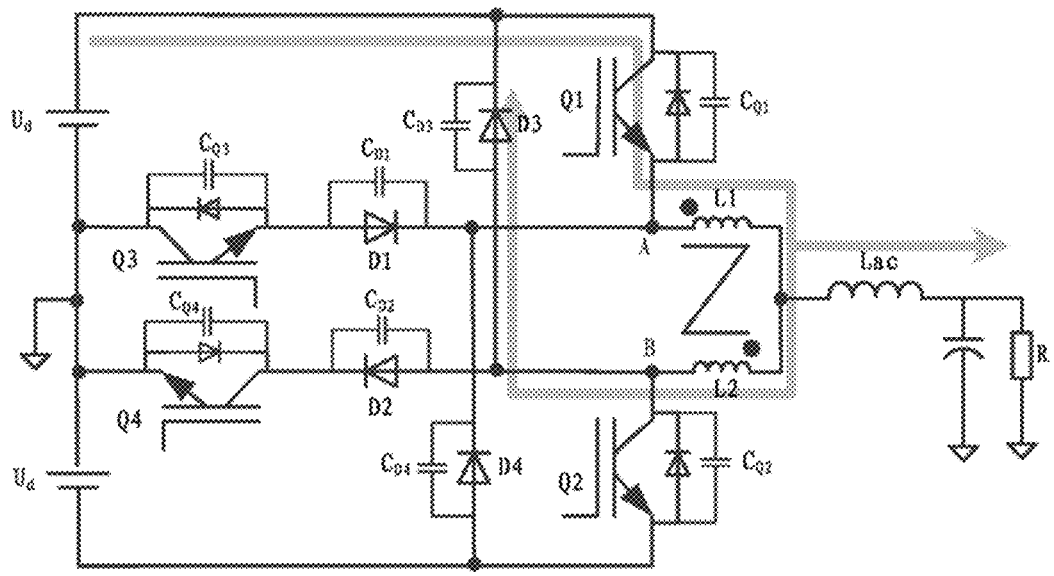
FIG. 4 is a principle schematic diagram of an operating mode 2 of an inverter circuit provided by an embodiment of the present invention.

As shown in FIG. 4, in the operating mode 2, after the voltage of the capacitor $C_{D3}$ drops to zero, the third diode D3 is switched on and freewheeled. At this time, the current $i_{L2}$ in the second inductor L2 drops, until $i_{L2}$ drops to zero. Thereafter, the second inductor L2 resonates with the capacitor $C_{Q2}$, the capacitor $C_{Q4}$, the capacitor $C_{D2}$ and the capacitor $C_{D3}$. At this time, the current $i_{L2}$ in the second inductor L2 may be calculated as follows since L2<<Lac and the current $i_{L2}$ in the second inductor is very small:

$$i_{L2}(t) = (U_d - u_o) \times \frac{L_1 + M}{L_1 + L_{ac}} \times \frac{1}{Z}\sin[\omega(t - t_1)].$$

Wherein $$Z = \sqrt{(L_1 + M) \times (C_{Q1} + C_{D1} + C_{D4})};$$

$$\omega = 1 \bigg/ \sqrt{(L_2 + M) \times \left(C_{Q2} + C_{D3} + \frac{C_{Q4} \times C_{D2}}{C_{Q4} + C_{D2}}\right)}.$$

$U_d$ is a voltage value of the input power supply, $u_o$ is a voltage value of the output voltage, $L_1$ is self inductance of the first inductor L1, $L_2$ is self inductance of the second inductor L2, M is mutual inductance between the first inductor L1 and the second inductor L2, Lac is self inductance of the filter inductor, $C_{Q2}$ is a capacitance value of the capacitor $C_{Q2}$, $C_{Q4}$ is a capacitance value of the capacitor $C_{Q4}$, $C_{D2}$ is a capacitance value of the capacitor $C_{D2}$, $C_{D3}$ is a capacitance value of the capacitor $C_{D3}$, and $t_1$ is a timing at which the current $i_{L2}$ in the second inductor drops to zero in the mode 2.

Figure 5:
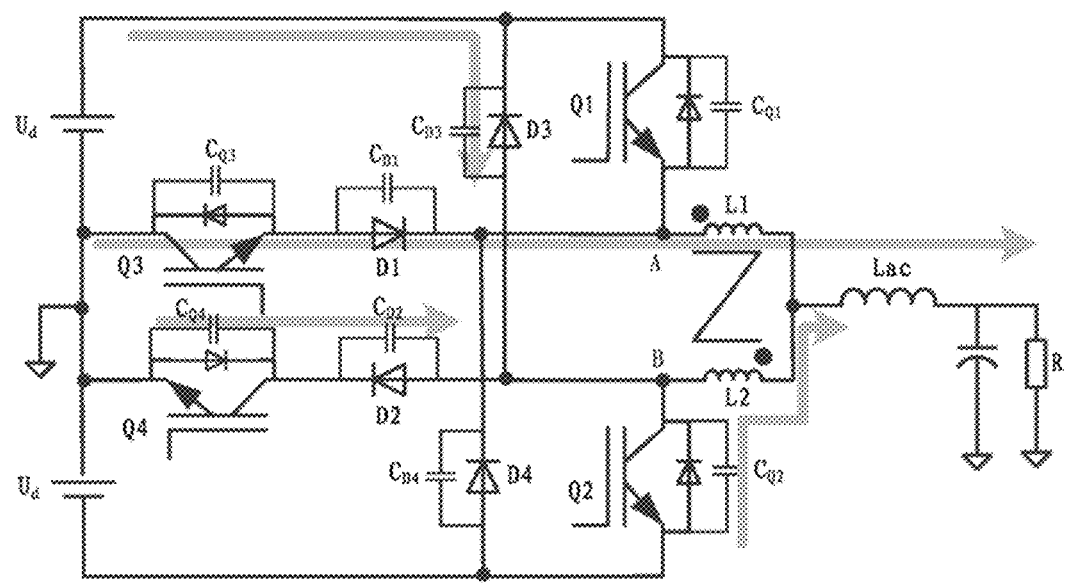
FIG. 5 is a principle schematic diagram of an operating mode 3 of an inverter circuit provided by an embodiment of the present invention.

As shown in FIG. 5, in the operating mode 3, the first switch tube Q1 is switched off, the third switch tube Q3 continues to be on, the first diode D1 is freewheeled and switched on, and the second switch tube Q2, the fourth switch tube Q4, the second diode D2, the third diode D3 and the fourth diode D4 are switched off. At this time, the input power supply $U_d$, the third switch tube Q3, the first diode D1, the first inductor L1, the filter inductor Lac and the load form a freewheeling circuit.

Under the effect of the output voltage $u_o$, the currents in the first inductor L1 and the filter inductor Lac drop, the capacitor $C_{Q2}$ and the capacitor $C_{Q4}$ are discharged, the capacitor $C_{D2}$ and the capacitor $C_{D3}$ are charged, the current $i_{L2}$ in the second inductor L2 reversely resonates and rises, the voltage across the capacitor $C_{Q2}$ and the voltage across the capacitor $C_{Q4}$ drop, and the voltage across the capacitor $C_{D2}$ and the voltage across the capacitor $C_{D3}$ rise. Subsequently, the second inductor L2 continues to resonate with the capacitor $C_{Q2}$, the capacitor $C_{Q4}$, the capacitor $C_{D1}$ and the capacitor $C_{D3}$. Due to the clamping of the third diode D3 and the anti-parallel diode of the second switch tube Q2, the voltage value of the second node B does not exceed $+U_d$ and $-U_d$. At this time, the current $i_{L2}$ in the second inductor L2 may be calculated as follows since L2<<Lac and the current $i_{L2}$ in the second inductor is very small:

$$i_{L2}(t) = \left(U_d - u_o \times \frac{L_1 + M}{L_1 + L_{ac}}\right) \times \frac{1}{Z}\sin[\omega(t - t_2)].$$

Wherein, Z and ω are the same as Z and ω in the operating mode 2 respectively, $u_o$ is a voltage value of the output voltage, $L_2$ is self inductance of the second inductor L2, M is mutual inductance between the first inductor L1 and the second inductor L2, Lac is self inductance of the filter inductor, and $t_2$ is a timing at which the first switch tube Q1 is switched off in the mode 3.

Figure 6:
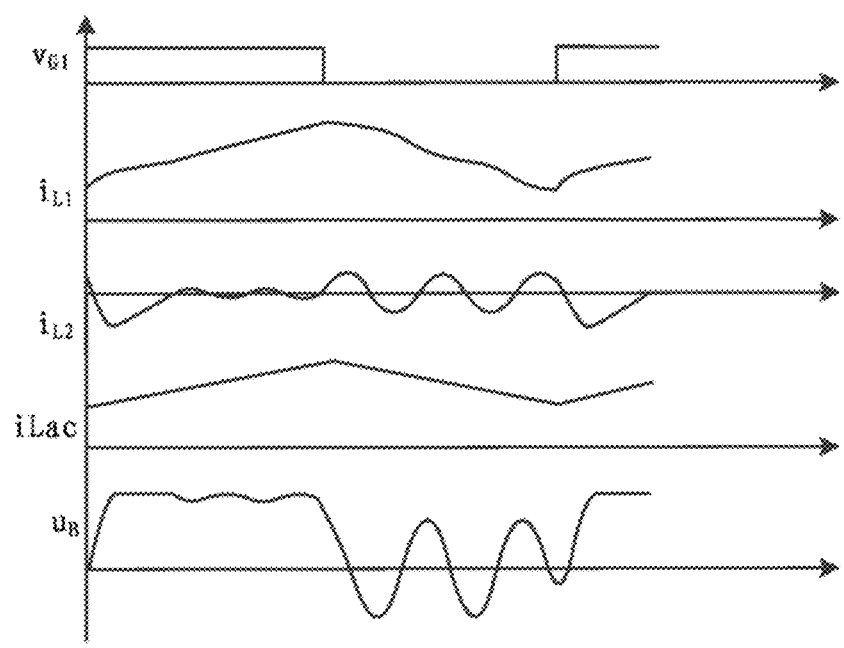
FIG. 6 is a waveform schematic diagram of operating mode switching of an inverter circuit provided by an embodiment of the present invention.

In specific implementation, when the output voltage value is greater than zero and the output current value is greater than zero, during switching of the inverter circuit between the operating mode 1, the operating mode 2 and the operating mode 3, the control signal of the first switch tube Q1, the change condition of the current in the first inductor L1, the change condition of the current in the second inductor L2, the change condition of the current in the filter inductor Lac and the change condition of the second node (point B) are as shown in FIG. 6.

Phase 2: the output voltage value is greater than zero and the output current value is less than zero.

When the output voltage value is greater than zero and the output current value is less than zero, the fourth switch tube Q4 is controlled utilizing a preset PWM signal, and the third switch tube Q3 is controlled to be on and the first switch tube Q1 and the second switch tube Q2 are controlled to be off.

In other embodiments of the present invention, when the output voltage value is greater than zero and the output current value is less than zero, it is also possible to control the fourth switch tube Q4 utilizing a preset PWM signal, and to control the first switch tube Q1, the second switch tube Q2 and the third switch tube Q3 to be off, and the embodiment of the present invention does not make a limitation hereto.

In specific implementation, when the output voltage value is greater than zero and the output current value is less than zero, the inverter circuit has four operating modes, which are assumed to be marked as operating mode 4, operating mode 5, operation mode 6 and operation mode 7 respectively. Hereinafter, the operating mode 4, the operating mode 5, the operating mode 6 and the operation mode 7 will be described in conjunction with FIG. 7 to FIG. 11 respectively.

Figure 7:
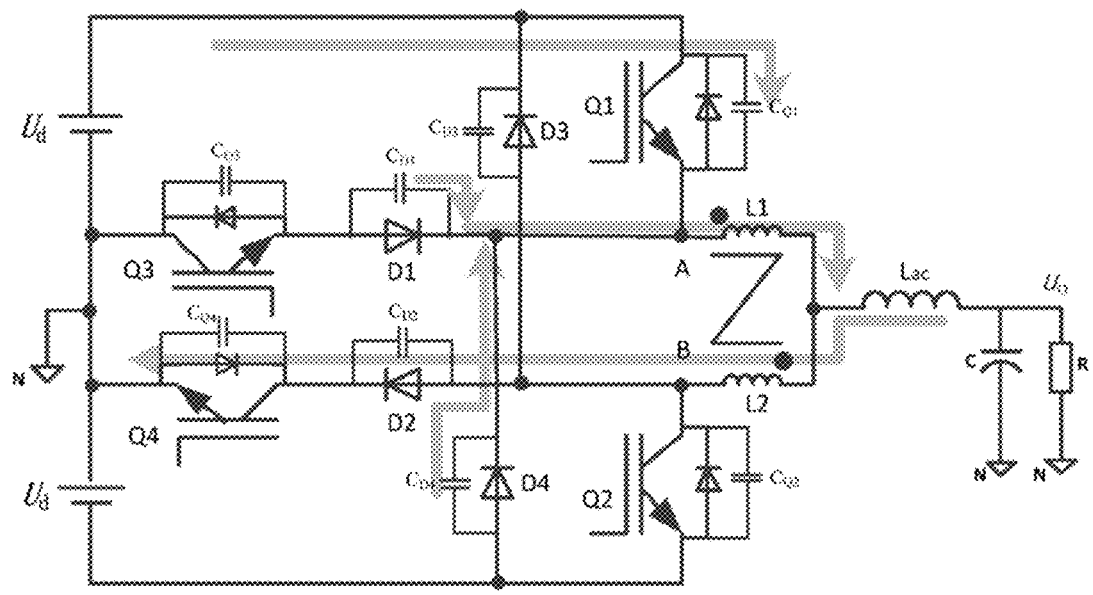
FIG. 7 is a principle schematic diagram of an operating mode 4 of an inverter circuit provided by an embodiment of the present invention.

As shown in FIG. 7, in the operating mode 4, the third switch tube Q3, the second diode D2 and the fourth switch tube Q4 are switched on, while the first switch tube Q1, the second switch tube Q2, the first diode D1, the third diode D3 and the fourth diode D4 are switched off. At this time, the input power supply $U_d$, the fourth switch tube Q4, the second diode D2, the second inductor L2, the filter inductor Lac and the load R form a current circuit. The voltage of the second node B is zero. Under the effect of the output voltage $u_o$, the currents in the second inductor L2 and the filter inductor Lac rise, the capacitor $C_{Q1}$ is charged, and the capacitor $C_{D1}$ and the capacitor $C_{D4}$ are discharged. The current $i_{L1}$ in the first inductor L1 and the current $i_{L2}$ in the second inductor L2 resonate and rise, the voltage across the capacitor $C_{Q1}$ rises and the voltage across the capacitor $C_{D1}$ and the voltage across the capacitor $C_{D4}$ drop, until the voltage of the capacitor $C_{Q1}$ rises to $U_d$, the voltage of the capacitor $C_{D4}$ drops to $U_d$ and the voltage of the capacitor $C_{D1}$ drops to zero.

Figure 8:
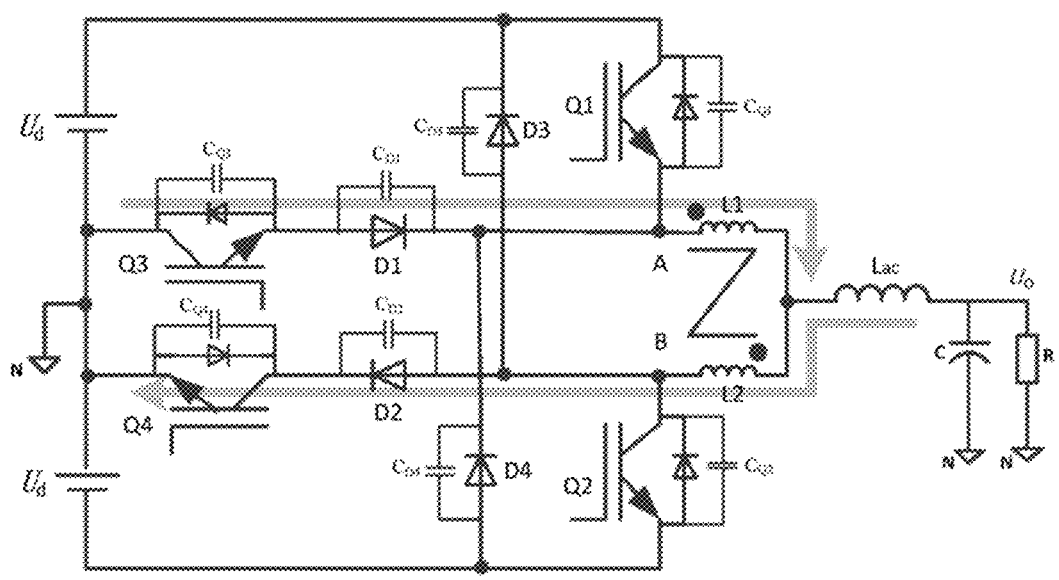
FIG. 8 is a principle schematic diagram of an operating mode 5 of an inverter circuit provided by an embodiment of the present invention.

As shown in FIG. 8, in the operating mode 5, after the voltage of the capacitor $C_{D1}$ drops to zero, the third switch tube Q3 and the first diode D1 are switched on and freewheeled. At this time, the current $i_{L1}$ in the first inductor L1 drops, until $i_{L1}$ drops to zero. Thereafter, the first inductor L1 resonates with the capacitor $C_{Q1}$, the capacitor $C_{D1}$ and the capacitor $C_{D4}$. At this time, the current $i_{L1}$ in the first inductor L1 may be calculated as follows since L1<<Lac and the current $i_{L1}$ in the first inductor is very small:

$$i_{L1}(t) = u_o \times \frac{L_2 + M}{L_2 + L_{ac}} \times \frac{1}{Z}\sin[\omega(t - t_3)].$$

Wherein, $Z=\sqrt{(L_1+M)\times(C_{Q1}+C_{D1}+C_{D4})};$ $\omega=1/\sqrt{(L_2+M)\times(C_{Q2}+C_{D1}+C_{D4})}.$ $u_o$ is a voltage value of the output voltage, $L_1$ is self inductance of the first inductor L1, $L_2$ is self inductance of the second inductor L2, M is mutual inductance between the first inductor L1 and the second inductor L2, Lac is self inductance of the filter inductor, $C_{Q1}$ is a capacitance value of the capacitor $C_{Q1}$, $C_{D1}$ is a capacitance value of the capacitor $C_{D1}$, $C_{D4}$ is a capacitance value of the capacitor $C_{D4}$, and $t_3$ is a timing at which the current $i_{L1}$ in the first inductor drops to zero in the mode 5.

Figure 9:
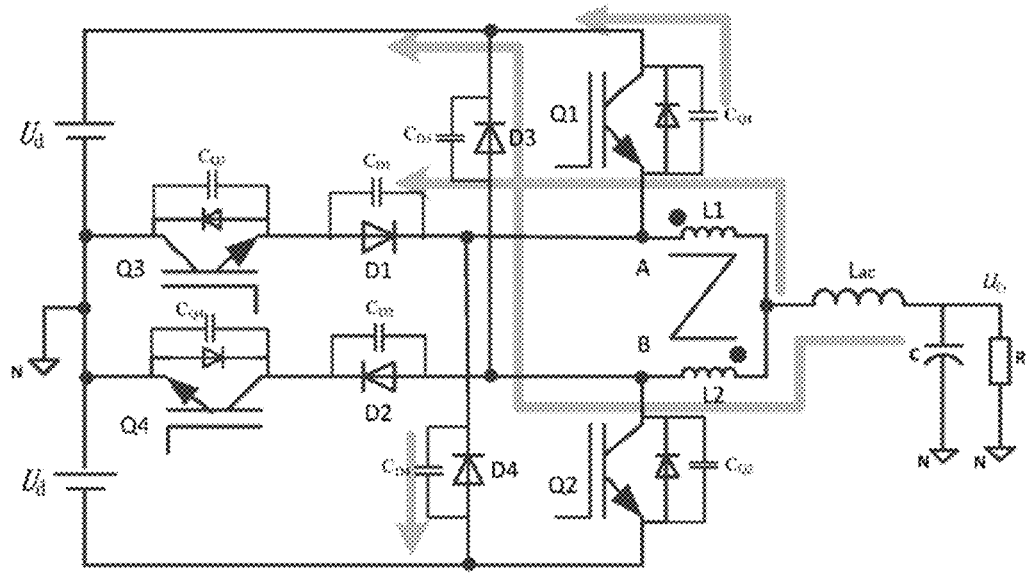
FIG. 9 is a principle schematic diagram of an operating mode 6 of an inverter circuit provided by an embodiment of the present invention.

As shown in FIG. 9, in the operating mode 6, the fourth switch tube Q4 is switched off, the third switch tube Q3 continues to be on, the third diode D3 is freewheeled and switched on, and the first switch tube Q1, the second switch tube Q2, the first diode D1, the second diode D2 and the fourth diode D4 are switched off. At this time, the input power supply $U_d$, the third diode D3, the second inductor L2, the filter inductor Lac and the load R form a freewheeling circuit. The voltage of the second node B is $+U_d$, and the currents in the second inductor L2 and the filter inductor Lac drop. The capacitor $C_{D1}$ and the capacitor $C_{D4}$ are charged, and the capacitor $C_{Q1}$ is discharged. The current $i_{L1}$ in the first inductor reversely resonates and rises, the voltage across the capacitor $C_{D1}$ and the voltage across the capacitor $C_{D4}$ rise and the voltage across the capacitor $C_{Q1}$ drops, until the voltage of the capacitor $C_{D1}$ rises to $U_d$, the voltage of the capacitor $C_{D4}$ rises to $2U_d$ and the voltage of the capacitor $C_{Q1}$ drops to zero.

Figure 10:
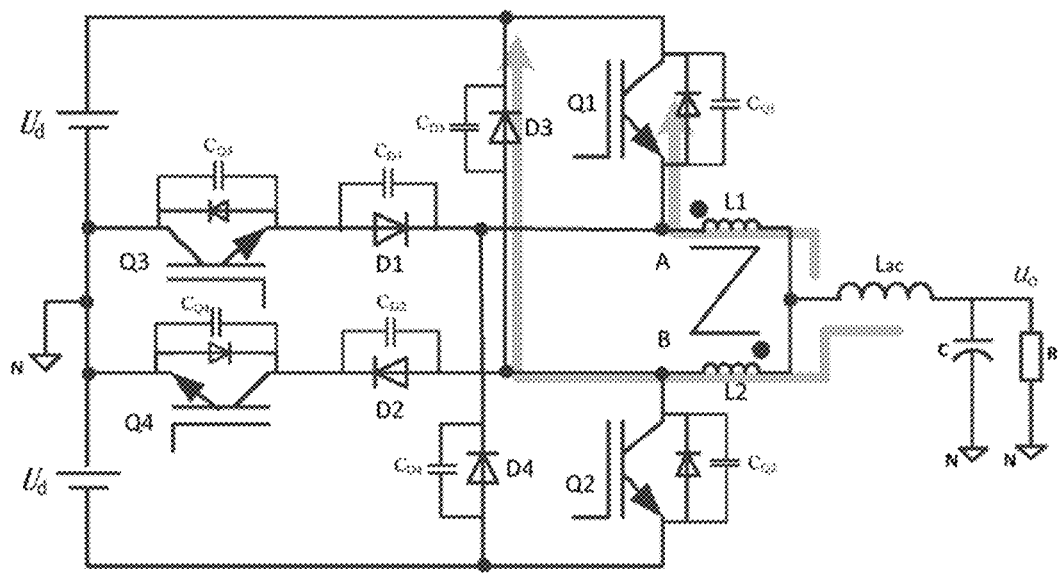
FIG. 10 is a principle schematic diagram of an operating mode 7 of an inverter circuit provided by an embodiment of the present invention.

As shown in FIG. 10, in the operating mode 7, after the voltage of the capacitor $C_{Q1}$ drops to zero, the anti-parallel diode of the first switch tube Q1 is naturally switched on and freewheeled. At this time, the current $i_{L1}$ in the first inductor drops, until the current $i_{L1}$ in the first inductor drops to zero. Thereafter, the first inductor L1 resonates with the capacitor $C_{Q1}$, the capacitor $C_{D1}$ and the capacitor CD4. At this time, the current $i_{L1}$ in the first inductor L1 may be calculated as follows since L1<<Lac and the current $i_{L1}$ in the first inductor is very small:

$$i_{L1}(t) = (U_d - u_o) \times \frac{L_2 + M}{L_2 + L_{ac}} \times \frac{1}{Z}\sin[\omega(t - t_4)].$$

Wherein, Z and ω are the same as Z and ω in the operating mode 5 respectively, $L_2$ is self inductance of the second inductor L2, M is mutual inductance between the first inductor L1 and the second inductor L2, Lac is self inductance of the filter inductor, and $t_4$ is a timing at which the current $i_{L1}$ in the first inductor drops to zero in the operating mode 7.

Figure 11:
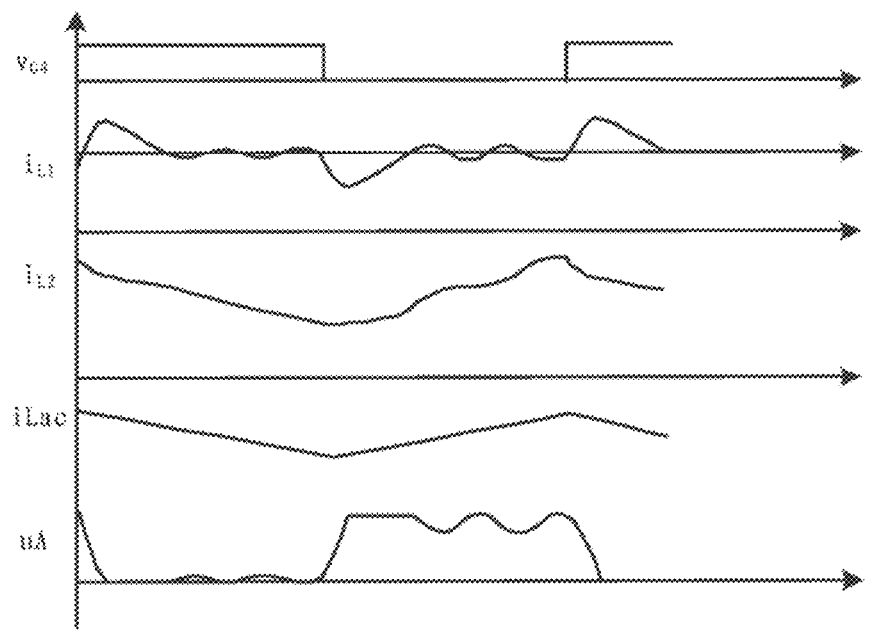
FIG. 11 is a waveform schematic diagram of another operating mode switching of an inverter circuit provided by an embodiment of the present invention.

In specific implementation, when the output voltage value is greater than zero and the output current value is less than zero, during switching of the inverter circuit between the operating mode 4, the operating mode 5, the operating mode 6 and the operating mode 7, the control signal of the fourth switch tube Q4, the change condition of the current in the first inductor L1, the change condition of the current in the second inductor L2, the change condition of the current in the filter inductor Lac and the change condition of the first node A are as shown in FIG. 11.

Phase 3: the output voltage value is less than zero and the output current value is less than zero.

When the output voltage value is less than zero and the output current value is less than zero, the second switch tube Q2 is controlled utilizing a preset PWM signal, and the fourth switch tube Q4 is controlled to be on and the first switch tube Q1 and the third switch tube Q3 are controlled to be off.

In specific implementation, when the output voltage value is less than zero and the output current value is less than zero, the inverter circuit has three operating modes, which are assumed to be marked as operating mode 8, operating mode 9 and operation mode 10 respectively. Hereinafter, the operating mode 8, the operating mode 9 and the operating mode 10 will be described in conjunction with FIG. 12 to FIG. 15 respectively.

Figure 12:
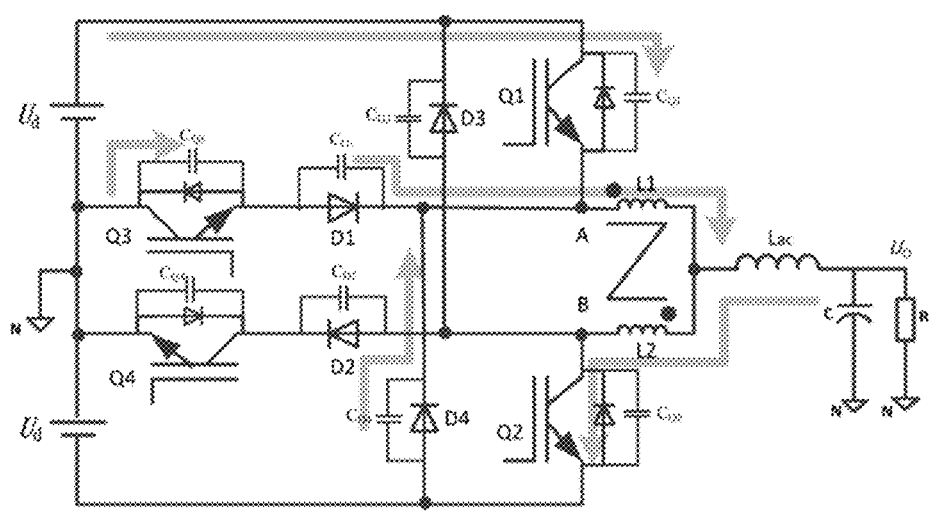
FIG. 12 is a principle schematic diagram of an operating mode 8 of an inverter circuit provided by an embodiment of the present invention.

As shown in FIG. 12, in the operating mode 8, the second switch tube Q2 and the fourth switch tube Q4 are switched on, while the first switch tube Q1, the third switch tube Q3, the first diode D1, the second diode D2, the third diode D3 and the fourth diode D4 are switched off. At this time, the input power supply $U_d$, the second switch tube Q2, the second inductor L2, the filter inductor Lac and the load R form a current circuit. The voltage of the second node B is −Ud. The currents in the second inductor L2 and the filter inductor Lac rise. The capacitor $C_{Q1}$ and the capacitor $C_{Q3}$ are charged, and the capacitor $C_{D1}$ and the capacitor $C_{D4}$ are discharged. The current $i_{L1}$ in the first inductor L1 and the current $i_{L2}$ in the second inductor L2 resonate and increase, the voltage across the capacitor $C_{Q1}$ and the voltage across the capacitor $C_{Q3}$ rise and the voltage across the capacitor $C_{D1}$ and the voltage across the capacitor $C_{D4}$ drop, until the voltage of the capacitor $C_{Q1}$ rises to $2U_d$ and the voltage of the capacitor $C_{D4}$ drops to zero.

Figure 13:
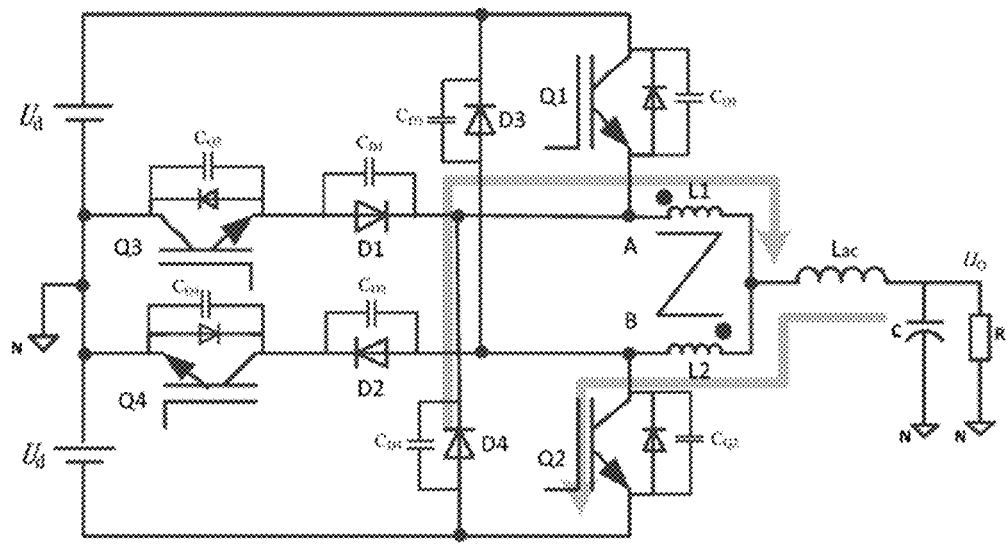
FIG. 13 is a principle schematic diagram of an operating mode 9 of an inverter circuit provided by an embodiment of the present invention.

As shown in FIG. 13, in the operating mode 9, after the voltage of the capacitor $C_{D4}$ drops to zero, the fourth diode D4 is naturally switched on and freewheeled. At this time, the current $i_{L1}$ in the first inductor drops, until the current $i_{L1}$ in the first inductor drops to zero. Thereafter, the first inductor L1 resonates with the capacitor $C_{Q1}$, the capacitor $C_{Q3}$, the capacitor $C_{D1}$ and the capacitor $C_{D4}$. At this time, the current $i_{L1}$ in the first inductor L1 may be calculated as follows since L1<<Lac and the current $i_{L1}$ in the first inductor is very small:

$$i_{L1}(t) = (U_d - u_o) \times \frac{L_2 + M}{L_2 + L_{ac}} \times \frac{1}{Z}\sin[\omega(t - t_5)].$$

Wherein, $$Z = \sqrt{(L_1 + M) \times \left(C_{Q1} + C_{D4} + \frac{C_{Q3} \times C_{D1}}{C_{Q3} + C_{D1}}\right)};$$

$$\omega = 1 \bigg/ \sqrt{(L_1 + M) \times \left(C_{Q1} + C_{D4} + \frac{C_{Q3} \times C_{D1}}{C_{Q3} + C_{D1}}\right)}.$$

$U_d$ is a voltage value of the input power supply, $u_o$ is a voltage value of the output voltage, $L_1$ is self inductance of the first inductor L1, $L_2$ is self inductance of the second inductor L2, M is mutual inductance between the first inductor L1 and the second inductor L2, Lac is self inductance of the filter inductor, $C_{Q1}$ is a capacitance value of the capacitor $C_{Q1}$, $C_{Q3}$ is a capacitance value of the capacitor $C_{Q3}$, $C_{D1}$ is a capacitance value of the capacitor $C_{D1}$, $C_{D4}$ is a capacitance value of the capacitor $C_{D4}$, and $t_5$ is a timing at which the current $i_{L1}$ in the first inductor drops to zero in the operating mode 9.

Figure 14:
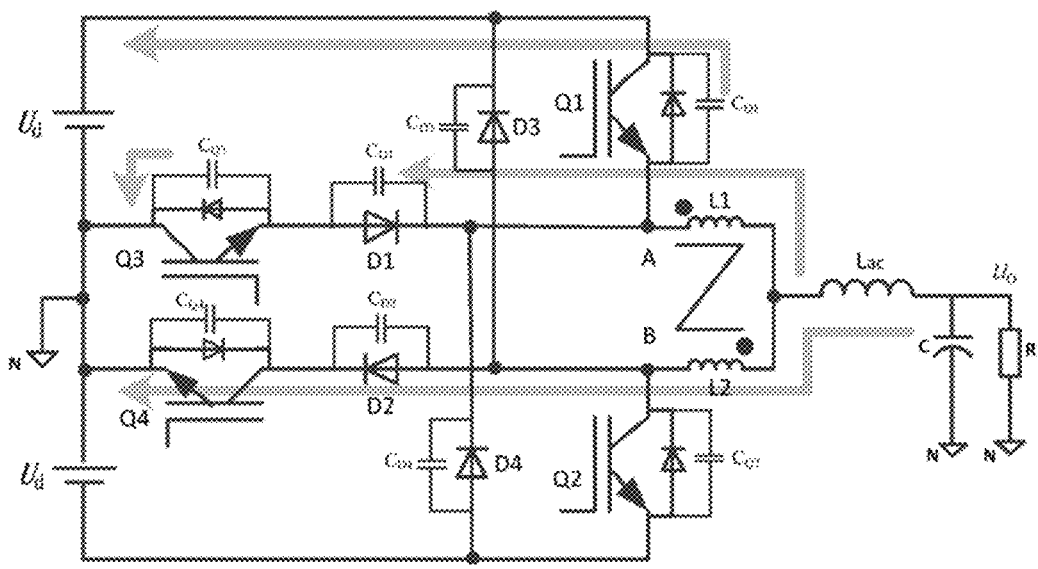
FIG. 14 is a principle schematic diagram of an operating mode 10 of an inverter circuit provided by an embodiment of the present invention.

As shown in FIG. 14, in the operating mode 10, the second switch tube Q2 is switched off, the fourth switch tube Q4 continues to be on, the second diode D2 is freewheeled and switched on, and the first switch tube Q1, the third switch tube Q3, the first diode D1, the third diode D3 and the fourth diode D4 are switched off. The input power supply $U_d$, the fourth diode D4, the second diode D2, the second inductor L2, the filter inductor Lac and the load R form a freewheeling circuit. Under the effect of the output voltage $u_o$, the currents in the second inductor L2 and the filter inductor Lac drop. The capacitor $C_{D1}$ and the capacitor $C_{D4}$ are charged, and the capacitor $C_{Q1}$ and the capacitor $C_{Q3}$ are discharged. The current $i_{L1}$ in the first inductor L1 reversely resonates and rises, the voltage across the capacitor $C_{Q1}$ and the voltage across the capacitor $C_{Q3}$ drop, and the voltage across the capacitor $C_{D1}$ and the voltage across the capacitor $C_{D4}$ rise. Subsequently, the first inductor L1 continue to resonate with the capacitor $C_{Q1}$, the capacitor $C_{Q3}$, the capacitor $C_{D1}$ and the capacitor $C_{D4}$. Due to the clamping of the fourth diode D4 and the anti-parallel didoe of the first switch tube Q1, the voltage value of the first node A does not exceed $+U_d$ and $-U_d$. At this time, the current $i_{L1}$ in the first inductor L1 may be calculated as follows since L1<<Lac and the current $i_{L1}$ in the first inductor L1 is very small:

$$i_{L1}(t) = \left(U_d - u_o \times \frac{L_2 + M}{L_2 + L_{ac}}\right) \times \frac{1}{Z}\sin[\omega(t - t_6)].$$

Wherein, Z and ω are the same as Z and ω in the operating mode 9 respectively, $u_o$ is a voltage value of the output voltage, $L_2$ is self inductance of the second inductor L2, M is mutual inductance between the first inductor L1 and the second inductor L2, Lac is self inductance of the filter inductor, and $t_6$ is a timing at which the second switch tube Q2 is switched off in the operating mode 10.

Figure 15:
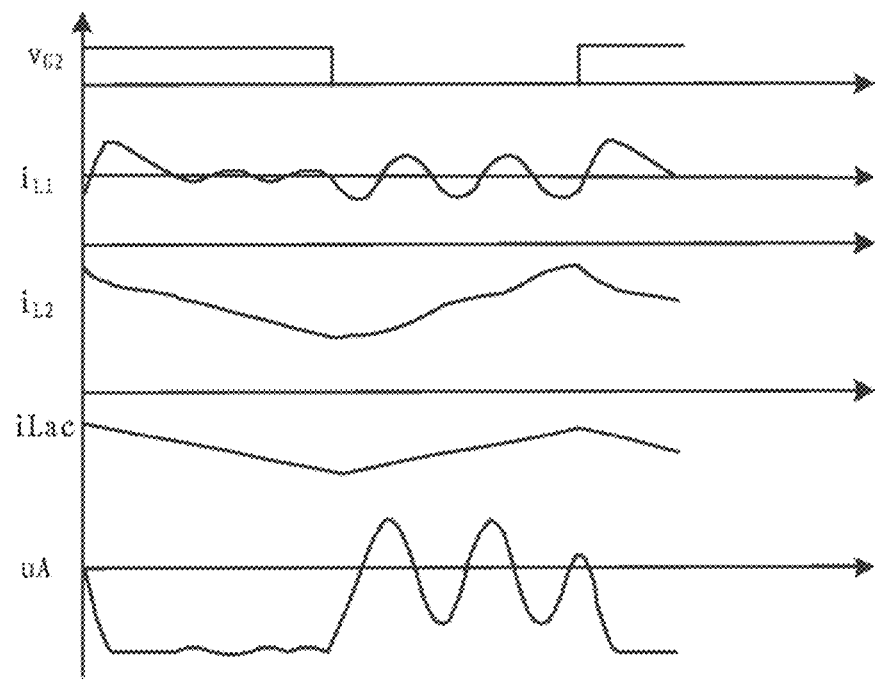
FIG. 15 is a waveform schematic diagram of still another operating mode switching of an inverter circuit provided by an embodiment of the present invention.

In specific implementation, when the output voltage value is less than zero and the output current value is less than zero, during switching of the inverter circuit between the operating mode 8, the operating mode 9 and the operating mode 10, the control signal of the second switch tube Q2, the change condition of the current in the first inductor L1, the change condition of the current in the second inductor L2, the change condition of the current in the filter inductor Lac and the change condition of the first node A are as shown in FIG. 15.

Phase 4: the output voltage value is less than zero and the output current value is greater than zero.

When the output voltage value is less than zero and the output current value is greater than zero, the third switch tube Q3 is controlled utilizing a preset PWM signal, and the fourth switch tube Q4 is controlled to be normally on and the first switch tube Q1 and the second switch tube Q2 are controlled to be off.

In other embodiments of the present invention, when the output voltage value is less than zero and the output current value is greater than zero, it is also possible to control the third switch tube Q3 utilizing a preset PWM signal, and to control the first switch tube Q1, the second switch tube Q2 and the fourth switch tube Q4 to be off, and the embodiment of the present invention does not make a limitation hereto.

In specific implementation, when the output voltage value is less than zero and the output current value is greater than zero, the inverter circuit has four operating modes, which are assumed to be marked as operating mode 11, operating mode 12, operation mode 13 and operation mode 14 respectively. Hereinafter, the operating mode 11, the operating mode 12, the operating mode 13 and the operation mode 14 will be described in conjunction with FIG. 16 to FIG. 20 respectively.

Figure 16:
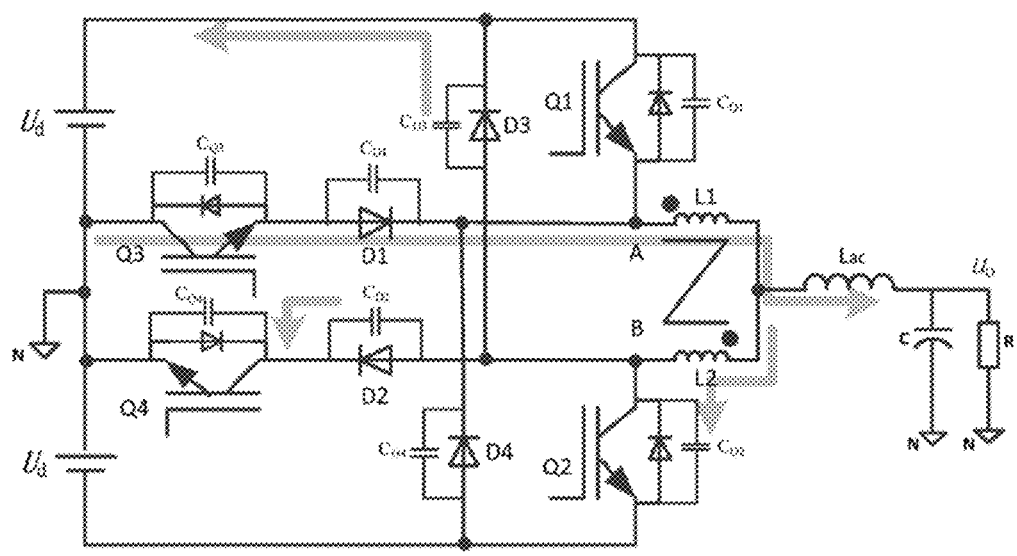
FIG. 16 is a principle schematic diagram of an operating mode 11 of an inverter circuit provided by an embodiment of the present invention.

As shown in FIG. 16, in the operating mode 11, the third switch tube Q3, the fourth switch tube Q4 and the first diode D1 are switched on, while the first switch tube Q1, the second switch tube Q2, the second diode D2, the third diode D3 and the fourth diode D4 are switched off. The input power supply $U_d$, the third switch tube Q3, the first diode D1, the first inductor L1, the filter inductor Lac and the load R form a current circuit. The voltage of the first node A is zero. Under the effect of the output voltage $u_o$, the currents in the first inductor L1 and the filter inductor Lac rise. The capacitor $C_{Q2}$ is charged, and the capacitor $C_{D2}$ and the capacitor $C_{D3}$ are discharged. The current $i_{L1}$ in the first inductor and the current $i_{L2}$ in the second inductor resonate and rise, the voltage across the capacitor $C_{Q2}$ rises and the voltage across the capacitor $C_{D2}$ and the voltage across the capacitor $C_{D3}$ drop, until the voltage of the capacitor $C_{Q2}$ rises to $U_d$, the voltage of the capacitor $C_{D3}$ drops to $U_d$ and the voltage of the capacitor $C_{D2}$ drops to zero.

Figure 17:
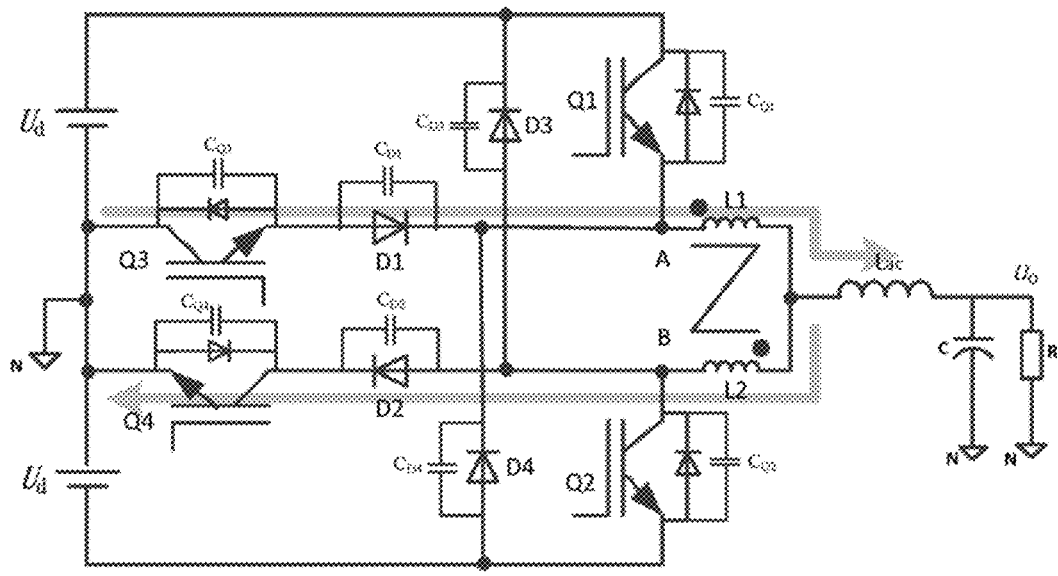
FIG. 17 is a principle schematic diagram of an operating mode 12 of an inverter circuit provided by an embodiment of the present invention.

As shown in FIG. 17, in the operating mode 12, after the voltage of the capacitor $C_{D2}$ drops to zero, the fourth switch tube Q4 and the second diode D2 are switched on and freewheeled. At this time, the current $i_{L2}$ in the second inductor L2 drops, until $i_{L2}$ drops to zero. Thereafter, the second inductor L2 resonates with the capacitor $C_{Q2}$, the capacitor $C_{D3}$ and the capacitor $C_{D2}$. At this time, the current $i_{L2}$ in the first inductor L2 may be calculated as follows since L2<<Lac and the current $i_{L2}$ in the second inductor is very small:

$$i_{L2}(t) = u_o \times \frac{L_1 + M}{L_1 + L_{ac}} \times \frac{1}{Z}\sin[\omega(t - t_7)].$$

Wherein, $$Z=\sqrt{(L_2+M)\times(C_{Q2}+C_{D3}+C_{D2})};$$

$$\omega=1/\sqrt{(L_2+M)\times(C_{Q2}+C_{D3}+C_{D2})}.$$

$U_d$ is a voltage value of the input power supply, $u_o$ is a voltage value of the output voltage, L1 is self inductance of the first inductor L1, $L_2$ is self inductance of the second inductor L2, M is mutual inductance between the first inductor L1 and the second inductor L2, Lac is self inductance of the filter inductor, $C_{Q2}$ is a capacitance value of the capacitor $C_{Q2}$, $C_{D2}$ is a capacitance value of the capacitor $C_{D2}$, $C_{D3}$ is a capacitance value of the capacitor $C_{D32}$, and $t_7$ is a timing at which the current $i_{L2}$ in the second inductor drops to zero in the operating mode 12.

Figure 18:
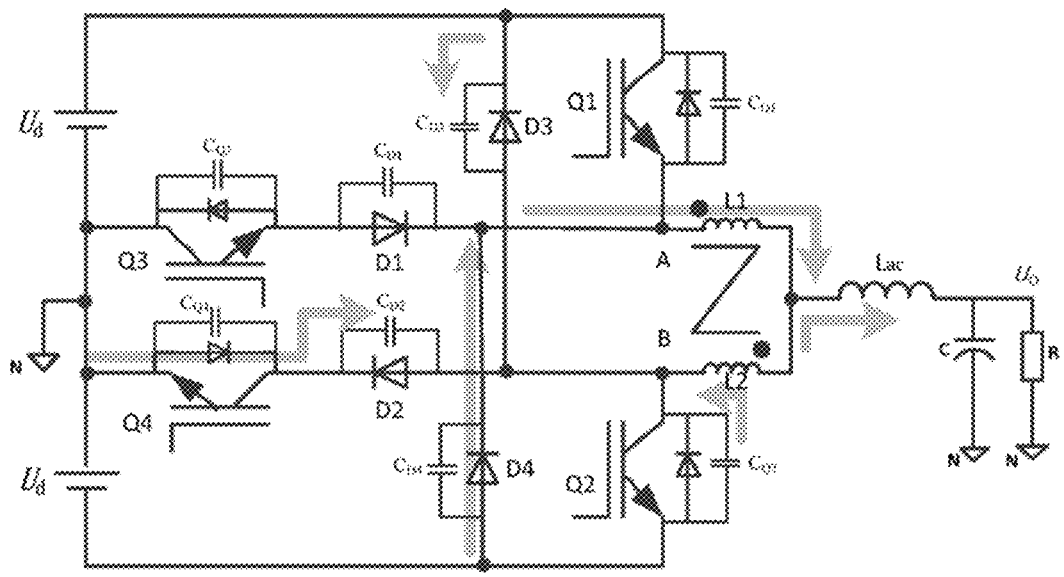
FIG. 18 is a principle schematic diagram of an operating mode 13 of an inverter circuit provided by an embodiment of the present invention.

As shown in FIG. 18, in the operating mode 13, the third switch tube Q3 is switched off, the fourth switch tube Q4 continues to be on, the fourth diode D4 is freewheeled and switched on, and the first switch tube Q1, the second switch tube Q2, the first diode D1, the second diode D2 and the third diode D3 are switched off. The input power supply $U_d$, the fourth switch tube Q4, the first inductor L1, the filter inductor Lac and the load R form a freewheeling circuit. The voltage of the first node A is $-U_d$, and the currents in the first inductor L1 and the filter inductor Lac decrease. The capacitor $C_{D2}$ and the capacitor $C_{D3}$ are charged, and the capacitor $C_{Q2}$ is discharged. The current $i_{L2}$ in the second inductor reversely resonates and rises, the voltage across the capacitor $C_{D2}$ and the voltage across the capacitor $C_{D3}$ rise and the voltage across the capacitor $C_{Q2}$ drops, until the voltage of the capacitor $C_{Q2}$ drops to zero.

Figure 19:
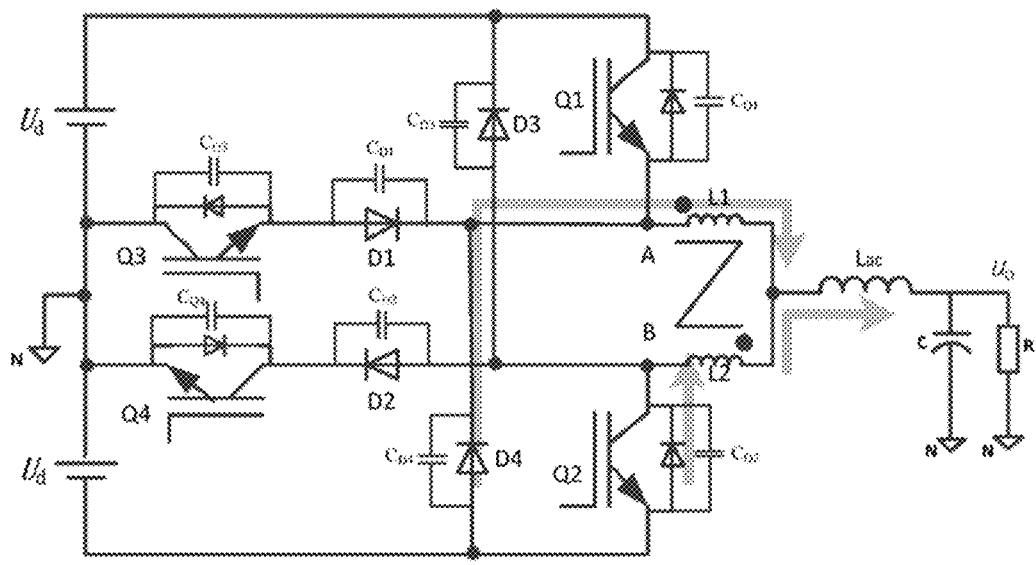
FIG. 19 is a principle schematic diagram of an operating mode 14 of an inverter circuit provided by an embodiment of the present invention.

As shown in FIG. 19, in the operating mode 14, after the voltage of the capacitor $C_{Q2}$ drops to zero, the anti-parallel diode of the second switch tube Q2 is naturally switched on and freewheeled. At this time, the current $i_{L2}$ in the second inductor drops, until $i_{L2}$ drops to zero. Thereafter, the second inductor L2 resonates with the capacitor $C_{Q2}$, the capacitor $C_{D2}$ and the capacitor $C_{D3}$. At this time, the current $i_{L2}$ in the second inductor L2 may be calculated as follows since L2<<Lac and the current $i_{L2}$ in the second inductor is very small:

$$i_{L2}(t) = (U_d - u_o) \times \frac{L_1 + M}{L_1 + L_{ac}} \times \frac{1}{Z}\sin[\omega(t - t_8)].$$

Wherein, Z and ω are the same as Z and ω in the mode 9 respectively.

$u_o$ is a voltage value of the output voltage, $L_2$ is self inductance of the second inductor L2, M is mutual inductance between the first inductor L1 and the second inductor L2, Lac is self inductance of the filter inductor, and $t_8$ is a timing at which the current $i_{L2}$ in the second inductor drops to zero in the operating mode 14.

Figure 20:
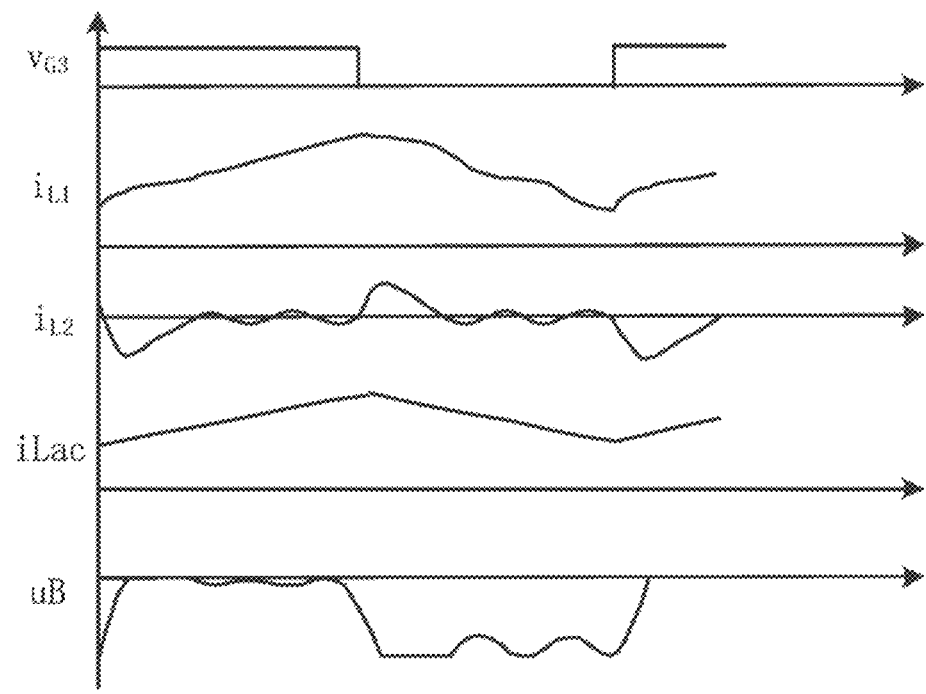
FIG. 20 is a waveform schematic diagram of yet another operating mode switching of an inverter circuit provided by an embodiment of the present invention.

In specific implementation, when the output voltage value is less than zero and the output current value is greater than zero, during switching of the inverter circuit between the operating mode 11, the operating mode 12, the operating mode 13 and the operating mode 14, the control signal of the third switch tube Q3, the change condition of the current in the first inductor L1, the change condition of the current in the second inductor L2, the change condition of the current in the filter inductor Lac and the change condition of the second node B are as shown in FIG. 20.

It should be noted that, in the inverter circuit provided by the embodiment of the present invention, since no large current flows through the anti-parallel didoes of the third switch tube Q3 and the fourth switch tube Q4, the third switch tube Q3 and the fourth switch tube Q4 may employ small-capacity didoes, and the embodiment of the present invention does not make a limitation hereto.

It should be noted that, the inverter circuit provided by the embodiment of the present invention may not only be applied to a single-phase inverter but also be applied to a two-phase, three-phase or multi-phase inverter, and the embodiment of the present invention does not make a limitation hereto.

In addition, an embodiment of the present invention further provides an inverter, wherein the inverter comprises the inverter circuit provided by the above-mentioned embodiment of the present invention.

Based on the inverter circuit provided by the above-mentioned embodiment of the present invention, an embodiment of the present invention further provides a control method of an inverter circuit.

Figure 21:
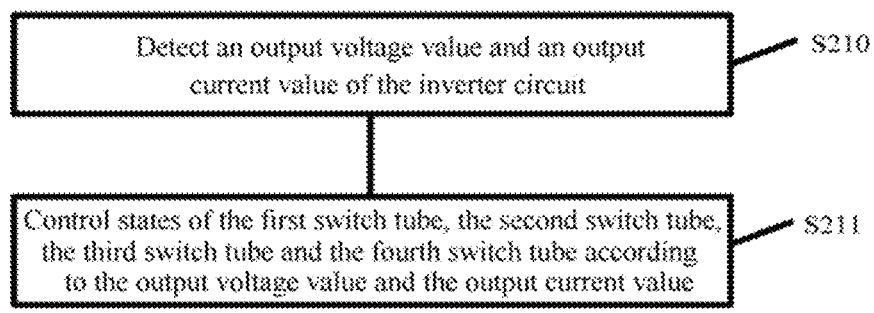
FIG. 21 is a schematic flowchart of a control method of an inverter circuit provided by an embodiment of the present invention.

As shown in FIG. 21, the control method of the inverter circuit provided by the embodiment of the present invention may comprise the following steps:

Step S210 of detecting an output voltage value and an output current value of the inverter circuit.

In specific implementation, the detecting an output voltage value and an output current value of the inverter circuit may be performed adopting the manner in the prior art; for example, the detecting an output voltage value of the inverter circuit may be performed by a voltmeter, and the detecting an output current value of the inverter circuit may be performed by detecting a current in the filter inductor Lac.

Step S211 of controlling states of the first switch tube, the second switch tube, the third switch tube and the fourth switch tube according to the output voltage value and the output current value.

In a possible implementation, the controlling states of the first switch tube, the second switch tube, the third switch tube and the fourth switch tube according to the output voltage value and the output current value comprises:

when the output voltage value is greater than zero and the output current value is greater than zero, controlling the first switch tube utilizing a preset PWM signal, and controlling the third switch tube to be on and controlling the second switch tube and the fourth switch tube to be off;

when the output voltage value is greater than zero and the output current value is less than zero, controlling the fourth switch tube utilizing a preset PWM signal, and controlling the third switch tube to be on and controlling the first switch tube and the second switch tube to be off;

when the output voltage value is less than zero and the output current value is less than zero, controlling the second switch tube utilizing a preset PWM signal, and controlling the fourth switch tube to be on and controlling the first switch tube and the third switch tube to be off; and when the output voltage value is less than zero and the output current value is greater than zero, controlling the third switch tube utilizing a preset PWM signal, and controlling the fourth switch tube to be on and controlling the first switch tube and the second switch tube to be off.

Figure 22:
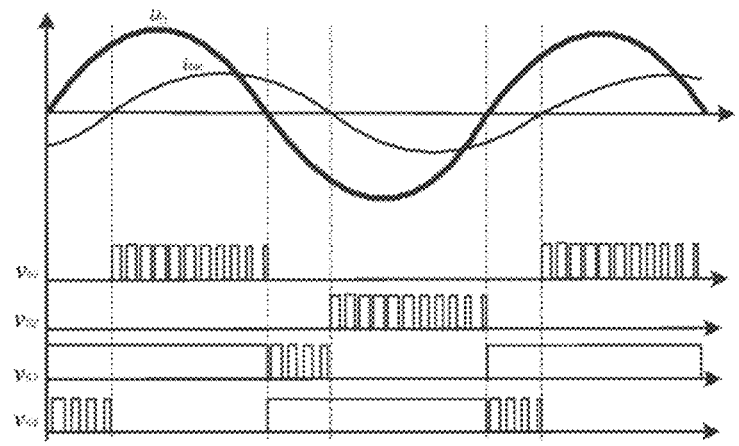
FIG. 22 is a control timing schematic diagram of switch tubes of an inverter circuit provided by an embodiment of the present invention.

In specific implementation, the control signal of the first switch tube Q1, the control signal of the second switch tube Q2, the control signal of the third switch tube Q3, the control signal of the fourth switch tube Q4, the waveform of the output voltage $u_o$ of the inverter circuit and the waveform of the output current $i_{Lac}$ of the inverter circuit are as shown in FIG. 22.

Figure 23:
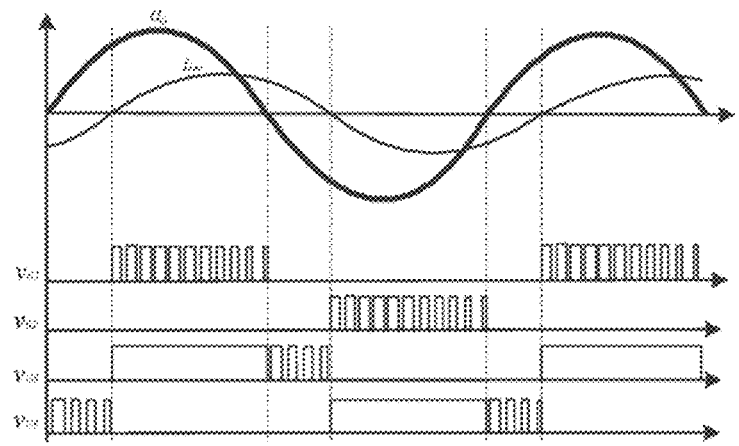
FIG. 23 is another control timing schematic diagram of switch tubes of an inverter circuit provided by an embodiment of the present invention.

In a possible implementation, the controlling states of the first switch tube, the second switch tube, the third switch tube and the fourth switch tube according to the output voltage value and the output current value comprises:

when the output voltage value is greater than zero and the output current value is greater than zero, controlling the first switch tube utilizing a preset PWM signal, and controlling the third switch tube to be on and controlling the second switch tube and the fourth switch tube to be off;

when the output voltage value is greater than zero and the output current value is less than zero, controlling the fourth switch tube utilizing a preset PWM signal, and controlling the first switch tube, the second switch tube and the third switch tube to be off;

when the output voltage value is less than zero and the output current value is less than zero, controlling the second switch tube utilizing a preset PWM signal, and controlling the fourth switch tube to be on and controlling the first switch tube and the third switch tube to be off; and when the output voltage value is less than zero and the output current value is greater than zero, controlling the third switch tube utilizing a preset PWM signal, and controlling the first switch tube, the second switch tube and the fourth switch tube to be off In specific implementation, the control signal of the first switch tube Q1, the control signal of the second switch tube Q2, the control signal of the third switch tube Q3, the control signal of the fourth switch tube Q4, the waveform of the output voltage $u_o$ of the inverter circuit and the waveform of the output current $i_{Lac}$ of the inverter circuit are as shown in FIG. 23.

Based on the same invention concept, an embodiment of the present invention further provides a control apparatus of an inverter circuit.

Figure 24:
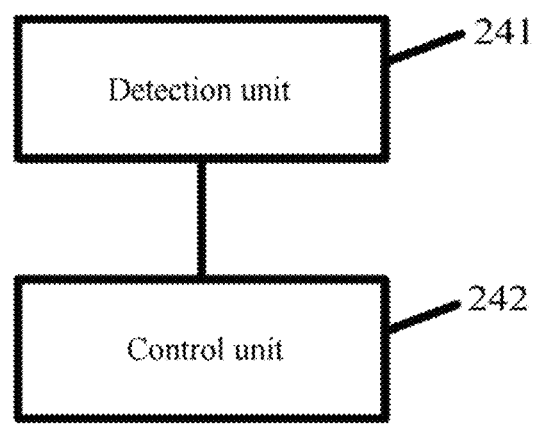
FIG. 24 is a structure schematic diagram of a control apparatus of an inverter circuit provided by an embodiment of the present invention.

As shown in FIG. 24, the control apparatus of the inverter circuit provided by the embodiment of the present invention comprises:

a detection unit 241 for detecting an output voltage value and an output current value of the inverter circuit; and a control unit 242 for controlling states of the first switch tube, the second switch tube, the third switch tube and the fourth switch tube according to the output voltage value and the output current value.

In a possible implementation, the control unit 242 is further used for:

when the output voltage value is greater than zero and the output current value is greater than zero, controlling the first switch tube utilizing a preset Pulse Width Modulation PWM signal, and controlling the third switch tube to be on and controlling the second switch tube and the fourth switch tube to be off;

when the output voltage value is greater than zero and the output current value is less than zero, controlling the fourth switch tube utilizing a preset Pulse Width Modulation PWM signal, and controlling the third switch tube to be on and controlling the first switch tube and the second switch tube to be off;

when the output voltage value is less than zero and the output current value is less than zero, controlling the second switch tube utilizing a preset Pulse Width Modulation PWM signal, and controlling the fourth switch tube to be on and controlling the first switch tube and the third switch tube to be off; and when the output voltage value is less than zero and the output current value is greater than zero, controlling the third switch tube utilizing a preset Pulse Width Modulation PWM signal, and controlling the fourth switch tube to be on and controlling the first switch tube and the second switch tube to be off.

In a possible implementation, the control unit 242 is further used for:

when the output voltage value is greater than zero and the output current value is greater than zero, controlling the first switch tube utilizing a preset Pulse Width Modulation PWM signal, and controlling the third switch tube to be on and controlling the second switch tube and the fourth switch tube to be off;

when the output voltage value is greater than zero and the output current value is less than zero, controlling the fourth switch tube utilizing a preset Pulse Width Modulation PWM signal, and controlling the first switch tube, the second switch tube and the third switch tube to be off;

when the output voltage value is less than zero and the output current value is less than zero, controlling the second switch tube utilizing a preset Pulse Width Modulation PWM signal, and controlling the fourth switch tube to be on and controlling the first switch tube and the third switch tube to be off; and when the output voltage value is less than zero and the output current value is greater than zero, controlling the third switch tube utilizing a preset Pulse Width Modulation PWM signal, and controlling the first switch tube, the second switch tube and the fourth switch tube to be off.

Figure 25:
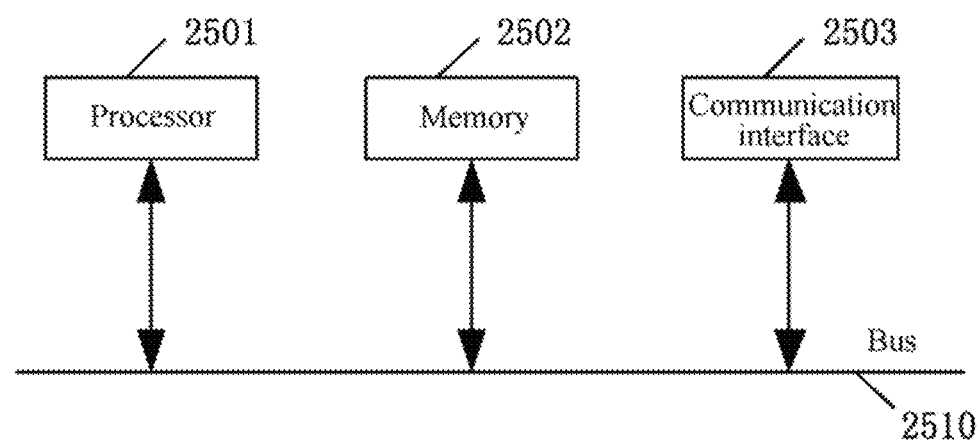
FIG. 25 is a structure schematic diagram of a control device of an inverter circuit provided by an embodiment of the present invention.

In addition, the control method and apparatus of the inverter circuit according to the embodiments of the present invention as described in conjunction with FIG. 21 to FIG. 24 may be implemented by a control device of the inverter circuit. Wherein, the control device of the inverter circuit may be a smart device or a controller of a smart device, and may also be a server. The embodiment of the present invention does not make a limitation to the specific implementation of the control device of the inverter circuit. FIG. 25 is a hardware structure schematic diagram of a control device of an inverter circuit provided by an embodiment of the present invention.

The control device of the inverter circuit may comprise a processor 2501, and a memory 2502 storing computer program instructions.

To be specific, the above-mentioned processor 2501 may comprise a Central Processor Unit (CPU) or an Application Specific Integrated Circuit (ASIC), or may be configured to one or more integrated circuits for implementing the embodiment of the present invention.

The memory 2502 may comprise a large-capacity memory for data or instructions. As an example but not a limitation, the memory 2502 may comprise a Hard Disk Drive (HDD), a floppy disk drive, a flash memory, a compact disk, a magneto optical disk, a magnetic tape or a Universal Serial Bus (USB) driver or a combination of two or more thereof. Where appropriate, the memory 2502 may comprise a removable or non-removable (or stationary) medium. Where appropriate, the memory 2502 may be inside or outside a data processing apparatus. In a specific embodiment, the memory 2502 is a nonvolatile solid state memory. In a specific embodiment, the memory 2502 comprises a Read-only Memory (ROM). Where appropriate, the ROM may be a mask-programmed ROM (PROM), an Erasable PROM (EPROM), an Electrically Erasable PROM (EEPROM), an Electrically Alterable ROM (EAROM) or a flash or a combination of two or more thereof.

The processor 2501 reads and executes the computer program instructions stored in the memory 2502, so as to implement any of control methods of the inverter circuit in the above-mentioned embodiment.

In an embodiment, the control device of the inverter circuit may further comprise a communication interface 2503 and a bus 2510. As shown in FIG. 25, the processor 2501, the memory 2502 and the communication interface 2503 are connected and implement communication between each other via the bus 2510.

The communication interface 2503 is mainly used for implementing communication between the respective modules, apparatuses, units and/or devices in the embodiment of the present invention.

The bus 2510 comprises hardware, software or both, and couples the components of the control device of the inverter circuit to each other. As an example but not a limitation, the bus may comprise Accelerated Graphics Port (AGP) or other graphics buses, Enhanced Industry Standard Architecture (EISA) bus, Front Side Bus (FSB), Hyper Transport (HT) interconnect, Industry Standard Architecture (ISA) bus, Infiniband interconnect, Low Pin Count (LPC) bus, memory bus, Micro Channel Architecture (MCA) bus, Peripheral Component Interconnect (PCI) bus, PCI-Express (PCI-X) bus, Serial Advanced Technology Attachment (SATA) bus, Video Electronics Standard Association Local (VLB) bus or other appropriate buses or a combination of two or more thereof. Where appropriate, the bus 2510 may comprise one or more buses. Although the embodiment of the present invention describes and shows a specific bus, the present invention considers any appropriate bus or interconnection.

The control device of the inverter circuit may implement the control method of the inverter circuit in the embodiment of the present invention based on the detected output voltage value and output current value of the inverter circuit, so as to implement the control method and apparatus of the inverter circuit as described in conjunction with FIG. 21 to FIG. 24.

In addition, in combination with the control method of the inverter circuit in the above-mentioned embodiment, an embodiment of the present invention may provide a computer readable storage medium for implementation. The computer readable storage medium has computer program instructions stored thereon; and the computer program instructions, when executed by a processor, implement any of control methods of the inverter circuit in the above-mentioned embodiment.

It should be noted that, although the foregoing detailed description mentions several units or sub-units of the apparatus, this division is only exemplary but not compulsory. Actually, according to the embodiments of the present application, the features and functions of two or more units as described above may be embodied in one unit. Conversely, the features and functions of one unit as described above may be embodied by further dividing the unit into a plurality of units.

Further, although the operations of the method of the present application are described in a specific order in the drawings, this does not require or suggest that it is necessary to perform these operations in the specific order or perform all the shown operations in order to realize a desired result. Additionally or alternatively, it is possible to omit some steps, to merge a plurality of steps into one step to be performed, and/or to decompose one step into a plurality of steps to be performed.

Those skilled in the art should appreciate that, the embodiments of the present application may be provided as a method, a system, or a computer program product. Therefore, the present application may take the form of a full hardware embodiment, a full software embodiment, or an embodiment relating to a combination of software and hardware. Also, the present application may take the form of a computer program product carried out on one or more computer usable storage media (including but not limited to magnetic disk memory, CD-ROM, optical memory and the like) comprising therein computer usable program codes.

The present application is described with reference to flowcharts and/or block diagrams of the method, device (system), and computer program product according to the embodiments of the present application. It should be understood that it is possible to implement, by computer program instructions, each flow and/or block in the flowcharts and/or block diagrams, and a combination of flows and/or blocks in the flowcharts and/or block diagrams. It is possible to provide these computer program instructions to a general-purpose computer, a special-purpose computer, an embedded processor or a processor of another programmable data processing device to generate a machine, so as to generate, by instructions executed by the computer or the processor of another programmable data processing device, apparatuses for implementing the function(s) specified in one or more flows in the flowcharts and/or one or more blocks in the block diagrams.

These computer program instructions may also be stored in a computer readable memory capable of guiding a computer or another programmable data processing device to operate in a specific manner, such that instructions stored in the computer readable memory generate a manufactured product comprising instruction means, the instruction means implementing a function(s) specified in one or more flowcharts in the flowcharts and/or one or more blocks in the block diagrams.

These computer program instructions may also be loaded to a computer or another programmable data processing device, so as to perform a series of operation steps on the computer or another programmable device to generate computer-implemented processing, such that instructions executed on the computer or another programmable device provide steps implement a step(s) of a function(s) specified in one or more flows in the flowcharts and/or one or more blocks in the block diagrams.

While preferred embodiments of the present application have been described, those skilled in the art may carry out additional alterations and modifications on these embodiments once they know the basic creative concept. Therefore, the appended claims are intended to be construed as including the preferred embodiments and all alterations and modifications falling with the scope of the present application.

Obviously, those skilled in the art may carry out various changes and variations on the present application without departing from the spirit and scope of the present application. Accordingly, if these modifications and variations of the present application are within the scope of the claims of the present application and equivalent techniques thereof, the present application is also intended to include these modifications and variations.

The invention claimed is:

1. An inverter circuit, comprising an inverter module and a filter module that are sequentially connected, characterized in that the inverter module comprises:
a first bridge arm connected between a positive bus and a negative bus, comprising a first switch tube, a first inductor, a second inductor and a second switch tube that are sequentially connected in series;
a second bridge arm connected between a neural point and a first node, comprising a third switch tube and a first diode that are connected in series, a collector of the third switch tube being connected with the neural point, an emitter of the third switch tube being connected with an anode of the first diode, a cathode of the first diode being connected with the first node, the first node being a connection point between the first switch tube and the first inductor;
a third bridge arm connected between the neural point and a second node, comprising a fourth switch tube and a second diode that are connected in series, an emitter of the fourth switch tube being connected with the neural point, a collector of the fourth switch tube being connected with a cathode of the second diode, an anode of the second diode being connected with the second node, the second node being a connection point between the second switch tube and the second inductor;
a first freewheeling branch connected between the positive bus and the second node; and
a second freewheeling branch connected between the negative bus and the first node,
wherein the first inductor is connected with the second inductor such that their heteronymous ends are connected each other.

2. The inverter circuit according to claim 1, characterized in that a collector of the first switch tube is connected with the positive bus, an emitter of the first switch tube is the first node, a collector of the second switch tube is the second node, and an emitter of the second switch tube is connected with the negative bus.

3. The inverter circuit according to claim 1, characterized in that the first switch tube, the second switch tube, the third switch tube and the fourth switch tube each include an anti-parallel diode and a junction capacitor.

4. The inverter circuit according to claim 1, characterized in that the first diode and the second diode each include a junction capacitor.

5. The inverter circuit according to claim 1, characterized in that the first freewheeling branch comprises a third diode, and the third diode includes a junction capacitor, an anode of the third diode being connected with the second node, a cathode of the third diode being connected with the positive bus.

6. The inverter circuit according to claim 1, characterized in that the second freewheeling branch comprises a fourth diode, and the fourth diode includes a junction capacitor, an anode of the fourth diode being connected with the negative bus, a cathode of the fourth diode being connected with the first node.

7. An inverter, characterized in that the inverter comprises the inverter circuit according to claim 1.

8. A control method of an inverter circuit, for controlling the inverter circuit according to claim 1, characterized by comprising:
   detecting an output voltage value and an output current value of the inverter circuit; and
   controlling states of the first switch tube, the second switch tube, the third switch tube and the fourth switch tube according to the output voltage value and the output current value.

9. The method according to claim 8, characterized in that the controlling states of the first switch tube, the second switch tube, the third switch tube and the fourth switch tube according to the output voltage value and the output current value comprises:
   when the output voltage value is greater than zero and the output current value is greater than zero, controlling the first switch tube utilizing a preset Pulse Width Modulation PWM signal, controlling the third switch tube to be on and controlling the second switch tube and the fourth switch tube to be off;
   when the output voltage value is greater than zero and the output current value is less than zero, controlling the fourth switch tube utilizing a preset Pulse Width Modulation PWM signal, controlling the third switch tube to be on and controlling the first switch tube and the second switch tube to be off;
   when the output voltage value is less than zero and the output current value is less than zero, controlling the second switch tube utilizing a preset Pulse Width Modulation PWM signal, controlling the fourth switch tube to be on and controlling the first switch tube and the third switch tube to be off; and
   when the output voltage value is less than zero and the output current value is greater than zero, controlling the third switch tube utilizing a preset Pulse Width Modulation PWM signal, controlling the fourth switch tube to be on and controlling the first switch tube and the second switch tube to be off.

10. The method according to claim 8, characterized in that the controlling states of the first switch tube, the second switch tube, the third switch tube and the fourth switch tube according to the output voltage value and the output current value comprises:
   when the output voltage value is greater than zero and the output current value is greater than zero, controlling the first switch tube utilizing a preset Pulse Width Modulation PWM signal, controlling the third switch tube to be on and controlling the second switch tube and the fourth switch tube to be off;
   when the output voltage value is greater than zero and the output current value is less than zero, controlling the fourth switch tube utilizing a preset Pulse Width Modulation PWM signal, and controlling the first switch tube, the second switch tube and the third switch tube to be off;
   when the output voltage value is less than zero and the output current value is less than zero, controlling the second switch tube utilizing a preset Pulse Width Modulation PWM signal, controlling the fourth switch tube to be on and controlling the first switch tube and the third switch tube to be off; and
   when the output voltage value is less than zero and the output current value is greater than zero, controlling the third switch tube utilizing a preset Pulse Width Modulation PWM signal, and controlling the first switch tube, the second switch tube and the fourth switch tube to be off.

11. A control apparatus of an inverter circuit, for controlling the inverter circuit according to claim 1, characterized by comprising:
   a detection unit for detecting an output voltage value and an output current value of the inverter circuit; and
   a control unit for controlling states of the first switch tube, the second switch tube, the third switch tube and the fourth switch tube according to the output voltage value and the output current value.

12. The apparatus according to claim 11, characterized in that the control unit is further used for:
   when the output voltage value is greater than zero and the output current value is greater than zero, controlling the first switch tube utilizing a preset Pulse Width Modulation PWM signal, controlling the third switch tube to be on and controlling the second switch tube and the fourth switch tube to be off;
   when the output voltage value is greater than zero and the output current value is less than zero, controlling the fourth switch tube utilizing a preset Pulse Width Modulation PWM signal, controlling the third switch tube to be on and controlling the first switch tube and the second switch tube to be off;
   when the output voltage value is less than zero and the output current value is less than zero, controlling the second switch tube utilizing a preset Pulse Width Modulation PWM signal, controlling the fourth switch tube to be on and controlling the first switch tube and the third switch tube to be off; and
   when the output voltage value is less than zero and the output current value is greater than zero, controlling the third switch tube utilizing a preset Pulse Width Modulation PWM signal, controlling the fourth switch tube to be on and controlling the first switch tube and the second switch tube to be off.

13. The apparatus according to claim 11, characterized in that the control unit is further used for:
   when the output voltage value is greater than zero and the output current value is greater than zero, controlling the first switch tube utilizing a preset Pulse Width Modulation PWM signal, controlling the third switch tube to be on and controlling the second switch tube and the fourth switch tube to be off;
   when the output voltage value is greater than zero and the output current value is less than zero, controlling the fourth switch tube utilizing a preset Pulse Width Modulation PWM signal, and controlling the first switch tube, the second switch tube and the third switch tube to be off;

when the output voltage value is less than zero and the output current value is less than zero, controlling the second switch tube utilizing a preset Pulse Width Modulation PWM signal, controlling the fourth switch tube to be on and controlling the first switch tube and the third switch tube to be off; and when the output voltage value is less than zero and the output current value is greater than zero, controlling the third switch tube utilizing a preset Pulse Width Modulation PWM signal, and controlling the first switch tube, the second switch tube and the fourth switch tube to be off.

* * * * *